United States Patent [19]
Gagné et al.

[11] Patent Number: 5,731,819
[45] Date of Patent: Mar. 24, 1998

[54] DEFORMATION OF A GRAPHIC OBJECT TO EMPHASIZE EFFECTS OF MOTION

[75] Inventors: Réjean Gagné, Montreal; Vincent Verville, Arthabaska; Yves Boucher, Terrebonne, all of Canada

[73] Assignee: Softimage, Montreal, Canada

[21] Appl. No.: 503,522

[22] Filed: Jul. 18, 1995

[51] Int. Cl.$^6$ .................................................. G06T 17/00
[52] U.S. Cl. ........................................................ 345/433
[58] Field of Search ........................... 395/133–139, 395/118, 119, 120, 123, 127, 141, 173–175; 345/433

[56] References Cited

U.S. PATENT DOCUMENTS

| | | | |
|---|---|---|---|
| 5,214,758 | 5/1993 | Ohba et al. | 395/175 X |
| 5,267,154 | 11/1993 | Takeuchi et al. | 395/960 X |
| 5,315,692 | 5/1994 | Hansen et al. | 395/950 X |

OTHER PUBLICATIONS

Pajon et al. "Direct Mouse–Driven Manipulations for Interactive Visualization of Structured Data" (1993).

*Primary Examiner*—Almis R. Jankus
*Attorney, Agent, or Firm*—Ronald M. Anderson

[57] ABSTRACT

A three-dimensional graphic object appearing in an animation is deformed to simulate the effects of motion on the object. A user can selectively apply a stretch, yield, or flex deformation effect to the control vertices of the object, to change the shape of the object as a function of any of a linear velocity, angular velocity, linear acceleration, or angular acceleration of the object. Various other parameters for each of these deformation effects can also be selected and set by the user, including a sensitivity to the motion in generating the deformation and a maximum deformation. The flex deformation can selectively be set to either a linear or curved profile, simulating the effect of friction applied by the environment on one or more surfaces of the object. The stretch deformation can selectively be set to either a constant or a free volume to simulate the effect of inertia, causing a body to elongate or shrink in the direction of the movement. The yield deformation can be set either a linear or curved profile, simulating the displacement of an object's internal matter toward one end that occurs, relative to the direction of the object's motion, i.e., causing one end to bulge. For each control vertex on the object, an effect offset is determined for each motion component and for each selected deformation effect. The sum of the effect offsets for the control vertex represents a total offset that is added to the original control vertex to determine a deformed control vertex. This step is repeated for all control vertices to produce the deformed object.

33 Claims, 13 Drawing Sheets

COMBINED FLEX (CURVED PROFILE), STRETCH (KEEP VOLUME), YIELD (CURVED PROFILE), LINEAR MOTION VECTOR

COMBINED FLEX (CURVED PROFILE), STRETCH (KEEP VOLUME), YIELD (CURVED PROFILE), ANGULAR MOTION VECTOR

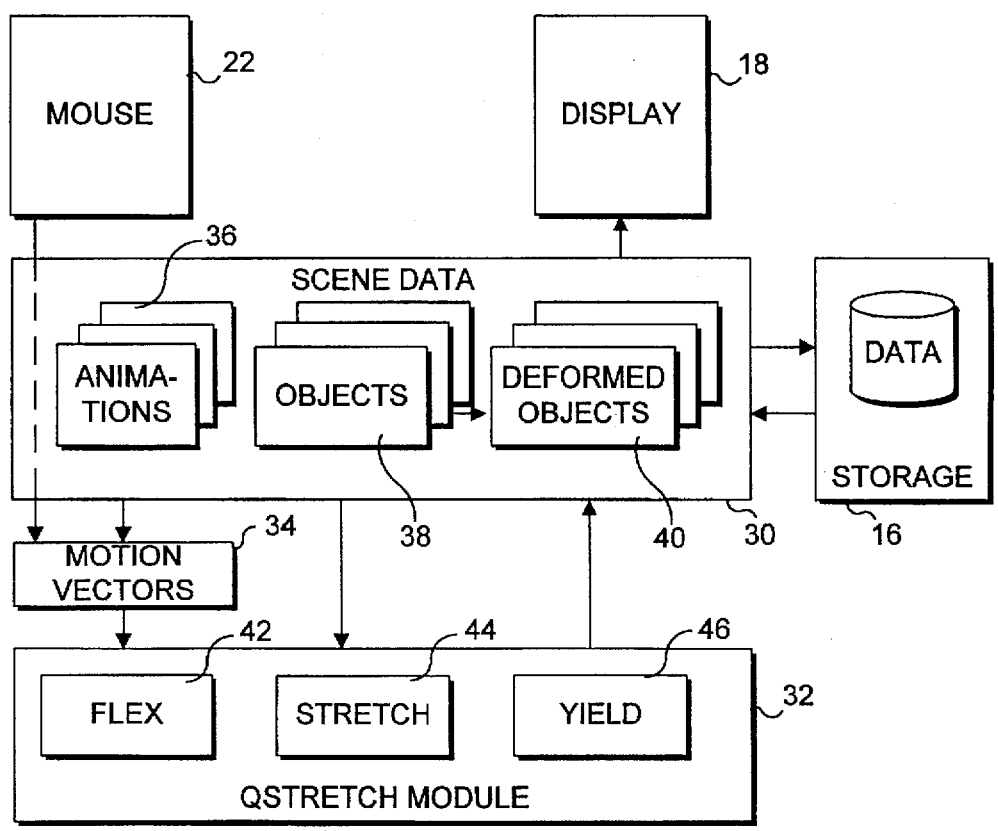
FIG. 3
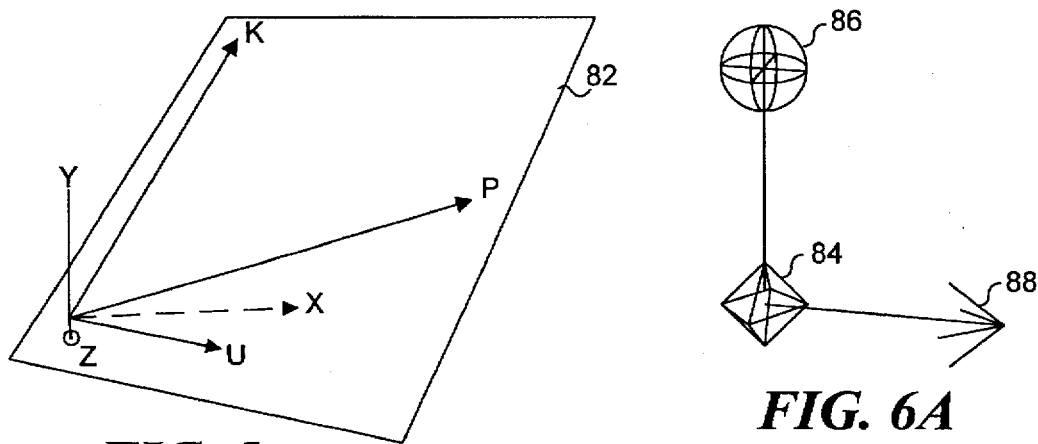
FIG. 5
FIG. 6A

STATIC

FLEX DEFORMATION,
LINEAR PROFILE, LINEAR
MOTION VECTOR

FLEX DEFORMATION, CURVED PROFILE, LINEAR MOTION VECTOR

FLEX DEFORMATION, LINEAR PROFILE, ANGULAR MOTION VECTOR

FLEX DEFORMATION,
CURVED PROFILE,
ANGULAR MOTION VECTOR

STRETCH DEFORMATION, KEEP
VOLUME (POSITIVE SENS.),
LINEAR MOTION VECTOR

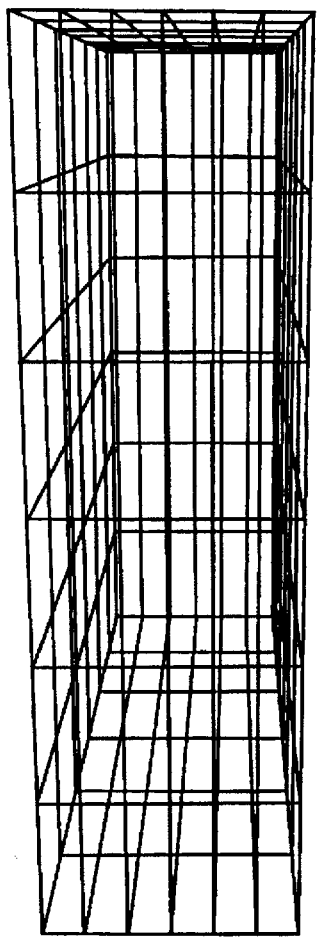
STRETCH DEFORMATION,
KEEP VOLUME (NEG. SENS.),
LINEAR MOTION VECTOR
*FIG. 13*
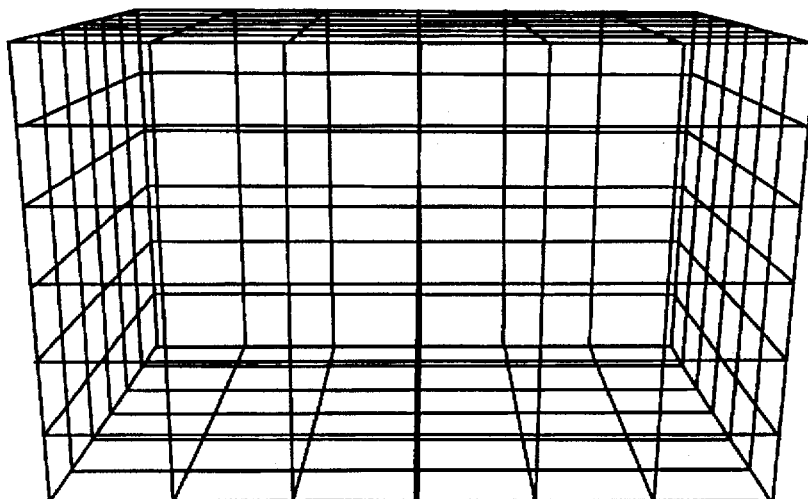
*FIG. 14*   STRETCH DEFORMATION, FREE
VOLUME (POSITIVE SENS.),
LINEAR MOTION VECTOR
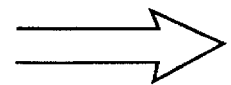

STRETCH DEFORMATION, FREE
VOLUME (NEGATIVE SENS.),
LINEAR MOTION VECTOR

STRETCH DEFORMATION, KEEP
VOLUME (POSITIVE SENS.),
ANGULAR MOTION VECTOR

STRETCH DEFORMATION, KEEP
VOLUME (NEGATIVE SENS.),
ANGULAR MOTION VECTOR

STRETCH DEFORMATION, FREE
VOLUME (POSITIVE SENS.),
ANGULAR MOTION VECTOR

STRETCH DEFORMATION, FREE
VOLUME (NEGATIVE SENS.),
ANGULAR MOTION VECTOR

YIELD DEFORMATION,
LINEAR PROFILE, LINEAR
MOTION VECTOR

YIELD DEFORMATION,
CURVED PROFILE,
LINEAR MOTION VECTOR

YIELD DEFORMATION,
CURVED PROFILE,
ANGULAR MOTION VECTOR

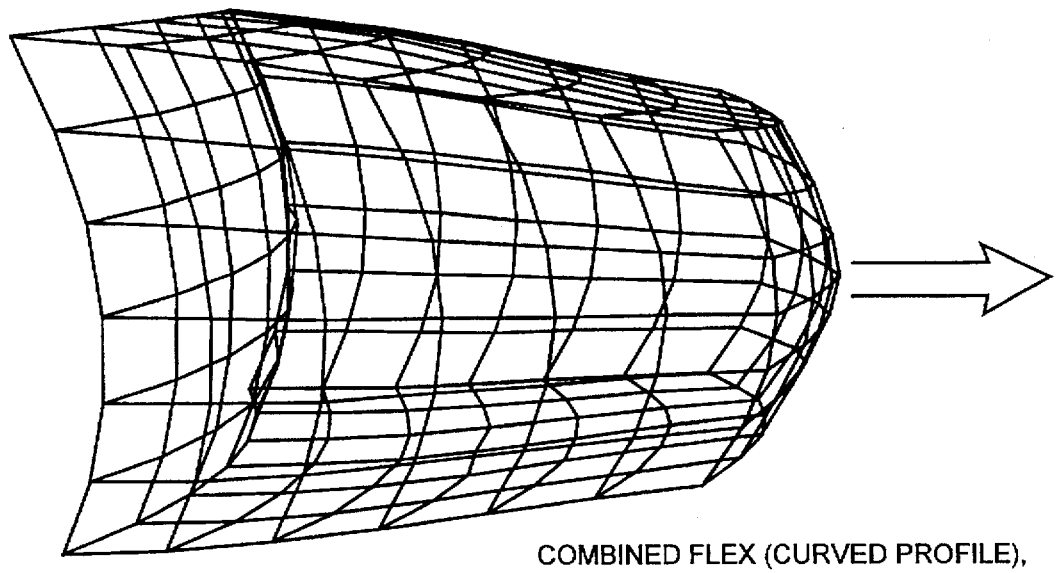
FIG. 23  COMBINED FLEX (CURVED PROFILE), STRETCH (KEEP VOLUME), YIELD (CURVED PROFILE), LINEAR MOTION VECTOR
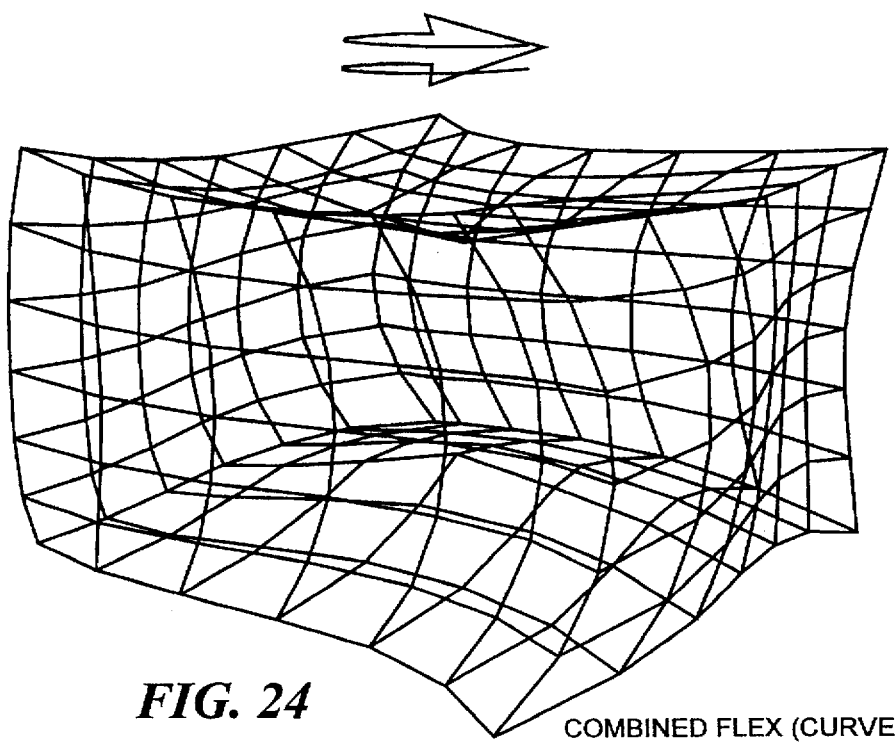
FIG. 24  COMBINED FLEX (CURVED PROFILE), STRETCH (KEEP VOLUME), YIELD (CURVED PROFILE), ANGULAR MOTION VECTOR

DEFORMATION OF A GRAPHIC OBJECT TO EMPHASIZE EFFECTS OF MOTION

FIELD OF THE INVENTION

This invention generally relates to the animation of graphic objects, and more specifically, pertains to deforming the graphic objects to simulate the effects of motion, producing a deformation such as might be caused by the inertia of the objects and/or friction of a fluid, so that the graphic objects appear less stiff.

BACKGROUND OF THE INVENTION

Three-dimensional (3D) computer animations typically include one or more objects in motion. As in the real world, an animated graphic object can be made to move with a linear velocity or acceleration, or with a rotational velocity or acceleration, or with a combination of these four motion components. If the shape of a graphic object in motion is identical to that of the object at rest, the animation will normally appear flat and uninteresting, because the object will seem too stiff. Cartoon animators recognize this problem and tend to greatly exaggerate the deformation of a graphic object to emphasize the effects of motion on it and to add anticipation. For example, when a vehicle accelerating down a street is illustrated in a 3D animation, the motion of the vehicle can be emphasized by deforming it so that its top is skewed toward the rear. In reality, the frame of a vehicle would be too stiff to permit such a drastic deformation, but in animations, reality is less important that the perceptions and expectations of an observer.

In a conventional 3D animation, deformation of a graphic object to illustrate the effects of motion is achieved by a relatively laborious and time consuming process. If the animation is hand-drawn animation, the animator would have to draw each frame of the animation, showing progressively more (or less) deformation of a moving graphic object in successive frames. Animations drawn with the assistance of a computer enable 3D objects to be drawn more efficiently; however, the deformation of a graphic object due to a motion component must still be manually determined. For example, selected control vertices of a wire frame representation of the graphic object would typically be manually moved on a computer display with a cursor, to change the shape of a graphic object in spaced-apart flames so as to produce a deformation that simulates the effects of motion. The computer can then interpolate the gradual changes in the shape of the graphic object in the intervening frames. Thus, even the computer-assisted 3D animation requires substantial time and manual effort to create the deformation of a graphic object due to the object's motion.

Clearly, it would be preferable for a computer to completely produce the deformation of a graphic object due to its motion, in every frame of an animation. The animator should be able to specify or set parameters that will control the deformation of a graphic object as a function of various components of its motion. These parameters should enable the operator to specify a deformation effect, determine the axes of the graphic object subject to deformation, determine its sensitivity to motion, and select a maximum deformation. Such a tool should greatly improve the efficiency with which animations can be produced and enable the animator to produce much more interesting animations with very little added effort.

SUMMARY OF THE INVENTION

In accordance with the present invention, a method is defined for deforming a graphic object, so that the graphic object appears to be less stiff when shown in motion. The method includes the steps of providing a motion vector for the graphic object that indicates its motion, and providing a plurality of control vertices for the graphic object. The control vertices define the shape of the graphic object. Offsets for each of the plurality of control vertices are determined as a function of the motion vector. The graphic object is then deformed by applying the offsets to the plurality of control vertices, thereby changing the shape of the graphic object so that it is deformed as desired.

Preferably, the motion vector defines at least one of a linear velocity, a rotational velocity, a linear acceleration, and a rotational acceleration for the graphic object. The step of deforming also preferably comprises the step of applying at least one of a flex, a stretch, and a yield deformation effect to the shape of the graphic object. The flex deformation effect comprises one of a linear profile flex deformation and a curved profile flex deformation of the graphic object. Similarly, the yield deformation effect comprises one of a linear profile yield deformation and a curved profile yield deformation of the graphic object. Another option enables an operator to selectively maintain the volume of the graphic object constant when applying the stretch deformation effect to the shape of the graphic object. To maintain a constant volume, any change in the shape of the graphic object relative to a first axis is compensated by a proportional offsetting change in the shape of the graphic object relative to a second axis that is orthogonal to the first axis.

The operator can also select other parameters that control the deformation of the graphic object. The parameters include at least one of a maximum deformation, a deformation sensitivity, a type of deformation effect to be applied to the graphic object, and a motion component that will be used for determining the deformation of the graphic object. The method further includes the step of tagging selected control vertices, and the parameters include an option to apply the offsets only to the control vertices that are tagged when deforming the object.

A pseudo motion vector can optionally be used to deform a static graphic object. In this case, the graphic object is not moving, yet the deformation is applied to it as if it is moving in accord with the pseudo motion vector.

A further aspect of the present invention is directed to a system for deforming a graphic object, so that the graphic object appears less stiff when illustrated in motion. The system includes a central processor that executes machine instructions. A memory is provided for storing the machine instructions to be executed by the central processor. Coupled to the central processor is a monitor for displaying the graphic object in accord with the machine instructions that are executed by the central processor. The machine instructions cause the central processor to implement functions that are generally consistent with the steps of the method discussed above.

Yet another aspect of the present invention is an article of manufacture. The article includes a nonvolatile memory storage device, and a plurality of machine instructions stored in the nonvolatile memory storage device. The plurality of machine instructions are adapted to cause a processor on which the plurality of machine instructions are input for execution to carry out functions that are also generally consistent with the steps of the above-described method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 3 is functional block diagram of the software components used in the present invention;

FIG. 5 is a geometric plot illustrating vectors related to the deformation of a graphic object as a function of the motion component of the graphic object;

FIG. 6A illustrates the control icons attached to a graphic object to which the present invention is applied;

FIG. 13 illustrates the stretch deformation of the wire frame representation of the cube, keeping the volume of the cube constant, with a negative sensitivity, determined as a function of a linear motion vector that defines the cube's motion;

FIG. 14 illustrates the stretch deformation of the wire frame representation of the cube, allowing the volume of the cube to freely change, with a positive sensitivity, determined as a function of a linear motion vector that defines the cube's motion;

FIG. 23 illustrates a combined flex (using a curved profile), stretch (keeping the volume constant), and yield (using a curved profile) deformation of the wire frame representation of the cube, determined as a function of a linear motion vector that defines the cube's motion; and FIG. 24 illustrates a combined flex (using a curved profile), stretch (keeping the volume constant), and yield (using a curved profile) deformation of the wire frame representation of the cube, determined as a function of an angular motion vector that defines the cube's motion.

DESCRIPTION OF THE PREFERRED EMBODIMENT

Figure 1:
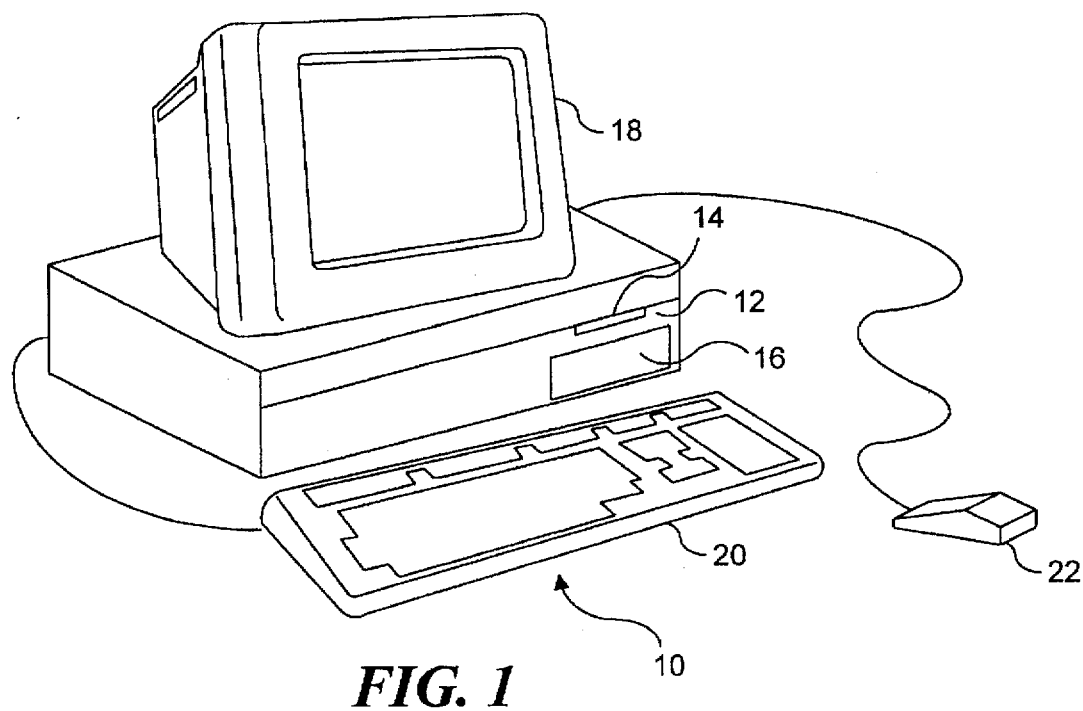
FIG. 1 is an isometric view of a personal computer system suitable for implementing the present invention.

The present invention is intended to be implemented on a graphics workstation, or alternatively, on a personal computer system 10, like that shown in FIG. 1. Personal computer 10 includes a processor chassis 12 in which are installed a floppy disk drive 14 and a hard drive 16. Atop the processor chassis is disposed a display 18. A keyboard 20 is coupled to the processor chassis for user input of instructions and/or data used in applications running on the personal computer. Further, selection can be made by a user of options and graphic objects presented on display 18, using a mouse 22 (or other conventional pointing device), and graphic objects can be manipulated by the user selecting the objects with the mouse select button and moving the mouse so that the objects move on the display in a corresponding manner.

Figure 2:
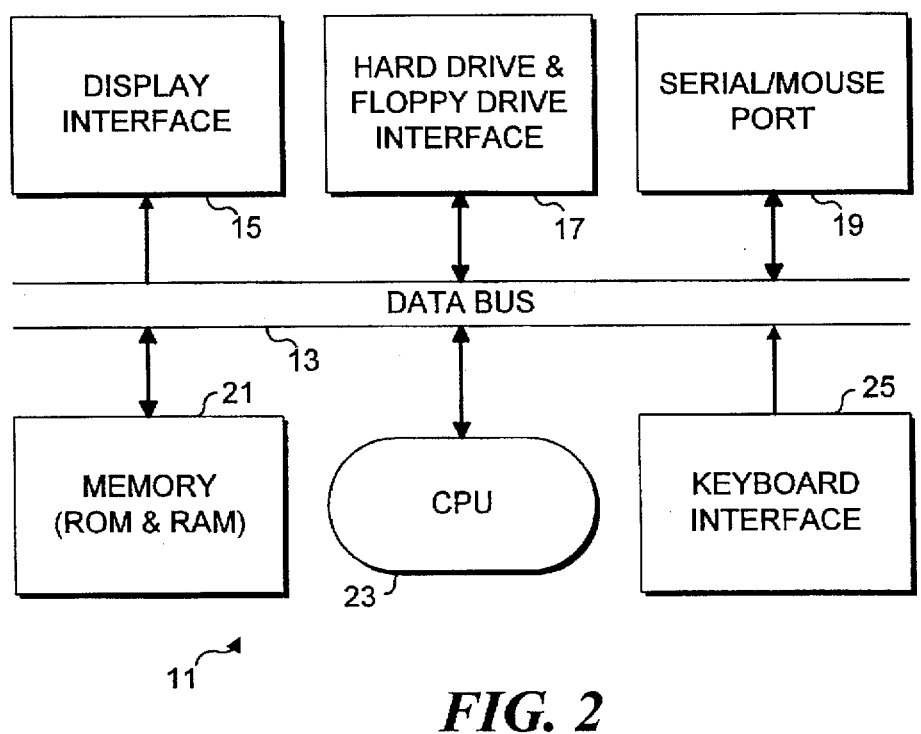
FIG. 2 is a block diagram showing internal components of the personal computer system.

FIG. 2 illustrates some of the components used in implementing the present invention on personal computer system 10. These components are generally disposed within processor chassis 12, as is well known to those of ordinary skill in the art. A data bus 13 provides a communication path between a central processing unit (CPU) 23 and the other components within processor chassis 12, such as a display interface 15. The data bus is also bidirectionally connected to a hard drive and floppy drive interface 17 so that data and application programs can be transferred through the data bus to or from a memory 21. Memory 21 includes both read only memory (ROM), which is non-volatile, and random access memory (RAM), which is volatile and is used for storing machine instructions comprising programs that are executed by the CPU. A serial/mouse port 19 is bidirectionally coupled to the data bus to convey signals between mouse 22 and CPU 23. Furthermore, a keyboard interface 25 couples signals from keyboard 20 to CPU 23 through the data bus.

The preferred embodiment of the present invention was developed as a module included in a 3D graphics program used for creating and editing animations. The module is referred to by the title QUICKSTRETCH™, which is often shortened to QSTRETCH™. To run the 3D graphics program, machine instructions comprising the program, which are stored on hard drive 16, are loaded into RAM within memory 21, for execution by CPU 23. These machine instructions are executed by CPU 23, causing it to implement the functions described below.

The 3D graphics program that includes the present invention has many other components and modules, which are not relevant and need not be discussed in this disclosure. Three types or effects can be applied to a graphic object by the QSTRETCH module, including stretch, flex, and yield deformations. Typically, QSTRETCH is used in connection with an animation that is being created or edited using the 3D graphics program. FIG. 3 illustrates the functional relationship between the components of animations 36 and a QSTRETCH module 32. A typical animation includes scene data, as indicated in a block 30, comprising graphic objects 38 that can be selectively deformed using the QSTRETCH module 32 by applying one of the flex, stretch, and yield deformations shown in blocks 42, 44, and 46, respectively. (Note that in the following discussion, the term "object" is used synonymously with the term "graphic object.") These deformation effects are normally determined as a function of a motion vector, as indicated in a block 34. The motion vectors, which define linear velocity and acceleration, and angular velocity and acceleration, can be obtained from plotted velocities and/or accelerations defined in a motion module of the 3D graphics program and can be adjusted using a curve editor. Alternatively, mouse 22 can be used to define the motion vectors by moving one or more selected object(s) along a desired trajectory, at a desired rate or acceleration. The user can selectively apply any of the three deformation effects as a function of any of the four possible motion vectors to which an object may be subject, yielding up to twelve degrees of deformation of the object by QSTRETCH module 32. Once an object has been deformed by the QSTRETCH module, it is output in scene data 30 as a deformed object 40, which can be shown on display 18 and may be stored on hard drive 16. Alternatively, if the 3D graphic program is run on a graphics workstation, separate data storage will be provided in a hard drive on a server to which the workstation is coupled through a network (none of these components are shown in the figures).

It is also possible to deform objects that are not moving by providing a pseudo motion vector that will be used as a basis for determining the deformation of the object. Such deformations may be applied, for example, to change the shape of a static object consistent with the way it would be deformed if moving in accord with the pseudo motion vector.

In the preferred embodiment, other types of deformations that are applied to an object, such as waves, envelopes, etc., are combined with the QSTRETCH module deformation of the object. Normally, the purpose of applying the QSTRETCH deformation to an object is to emphasize the effect of a motion, thereby creating greater interest and fluidity in the animation in which the object is used. The flex deformation is applied to an object so that it appears to bend or flex in the direction opposite to its motion, for example, due to the resistance of air (or water) through which the object is moving.

The stretch deformation serves another purpose. Typically, in cartoons, a "squash and stretch" effect is applied, causing an object to appear to elongate in the direction of a motion and become thinner in the other directions. The resulting stretch deformation can be applied in connection with a positive sensitivity or negative sensitivity, as discussed below.

Depending on its mass, a moving object may appear to bulge due to the internal displacement of its mass, resulting from its motion. This effect is simulated by the yield deformation of the object. Typically, an object moves because it is pushed or pulled. For example, a truck may include an engine that causes the object to move on its own, while a ball may be subject to the force of gravity, causing it to fall and accelerate when dropped. The forces that cause an object to move are applied somewhere on the object and effect how a flexible object deforms. The QSTRETCH module generates a deformed object by applying the motion vector to an imaginary point called the center of the object, which can be moved relative to the control vertices, depending upon the nature of the object. For example, if a character hits a box, it should deform from the point where it was hit, or, if a building is subject to a strong wind, it should bend and deform from the ground up, since a building is expected to be attached to the ground. The center of the building should then be located at the ground. By changing the position of the center of the object, the effect resulting from the application of the QSTRETCH module can be made to conform to the observer's expectations. Furthermore, the degree to which an object is deformed by the QSTRETCH module can be set by the user to appear realistic, or alternatively, can be set to a more extreme level suitable for cartoon animations.

An object that is deformed using the QSTRETCH module can be part of another object. For example, using the QSTRETCH module, a bat held by an animated character can be deformed, independent of the arms of the character swinging the bat. However, in some cases, objects in an animation are intentionally related to each other. Thus, an object may be a "child" of a "parent object," which may in turn be a child of another parent object. Characteristics of the child object are inherited from the parent object. However, the parameters applied by the QSTRETCH module for deforming an object can be selectively set so that the QSTRETCH module uses the object's own parameters instead of the parameters of the parent object.

Figure 4:
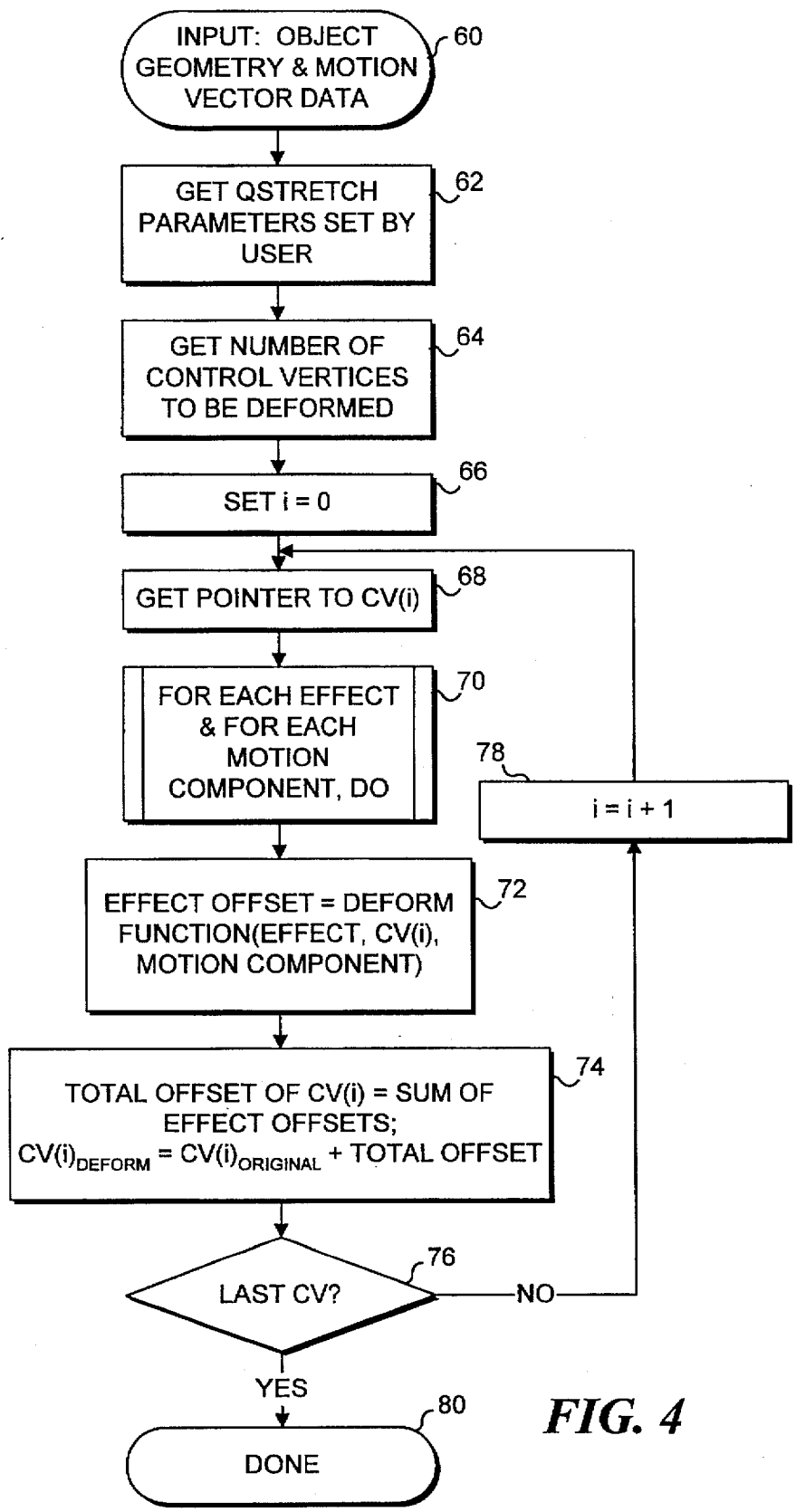
FIG. 4 is a flow chart illustrating the logical steps implemented to deform a graphic object to show the effect of its motion.

FIG. 4 is a flow chart illustrating the steps that are carried out by the CPU in implementing the present invention. A block 60 provides for input of an object in terms of its geometry, and also input of its motion vector data. The geometry of an object comprises a plurality of control vertices that define the 3D shape of the object. In order to provide a realistic deformation, an object must be subdivided into a sufficient number of control vertices so that the deformation will appear to be realistic. This point will be more evident in regard to the Examples discussed below. The motion vector data input in block 60 define the velocity of the object and/or its acceleration.

A block 62 indicates that the QSTRETCH parameters set by the user are obtained. These parameters are discussed below, in connection with a dialog box that provides an opportunity for the user to set up the parameters that will be applied to a particular object in an animation.

A block 64 indicates that the system obtains the number of control vertices that are to be deformed. These control vertices are defined in the object geometry data, which specify the shape and subdivisions of an object used in an animation. In a block 66, a counter variable, i, is initialized to zero. Next, in a block 68, the system obtains a pointer to control vertex (i). Initially, the pointer will be to the first control vertex (i.e., vertex 0). It will be apparent that the steps following block 68 are repetitively applied in processing each control vertex of an object, to determine the deformation that will be applied to the control vertices comprising the object, to produce the deformed object.

In a block 70, a plurality of DO loops are initiated, for each effect, i.e., yield, flex, and/or stretch, selected for the object by the user, and for each motion component, i.e., linear velocity, angular velocity, linear acceleration, and/or angular acceleration, which the user has selected as a basis for deforming the object. For a particular deformation effect, a block 72 provides for determining an effect offset, which is equal to the deformation function for the effect, determined as a function of the control vertex (i) and the motion component selected by the user. For a particular object, there may be only a single effect and a single motion component. However, the user may alternatively choose to include another effect and may select additional motion components to determine how the deformation effect is applied. In a block 74, the total offset for the current control vertex is determined by summing the effect offsets determined in block 72 for each effect and motion component selected, and the current deformed control vertex is determined by adding the total offset to the original current control vertex (undeformed).

A decision block 76 determines if the system has processed the last control vertex for an object and if not, the system loops to a block 78, which incrementally increases counter variable i by one. The logic then returns to block 68 to obtain a pointer to the next control vertex based upon the incremented value i. However, if the last control vertex has been processed in decision block 76, the program terminates at a block 80.

Once the QSTRETCH module is selectively applied to an object, the preferred embodiment provides two control icons that are created and attached to the object as shown in FIG. 6A. An object 84 in this Figure is attached to a spherical tip icon 86 and an arrow tip icon 88. The spherical tip icon can be used to control the rotational velocity of an object, while the arrow tip icon can be used to control its linear velocity. No icons are provided in the preferred embodiment for controlling the acceleration of the object. If the user selects the spherical tip icon with the mouse, it can be sealed in the vertical, or Y, direction to determine the amplitude of the rotational or angular velocity. Similarly, the arrow tip icon can be adjusted with the mouse to set the amplitude of the linear velocity. Furthermore, as an object is moved using the mouse, the amplitude of these control icons changes in a corresponding fashion to reflect the current speed (linear and/or rotational) of the object.

Figure 6B:
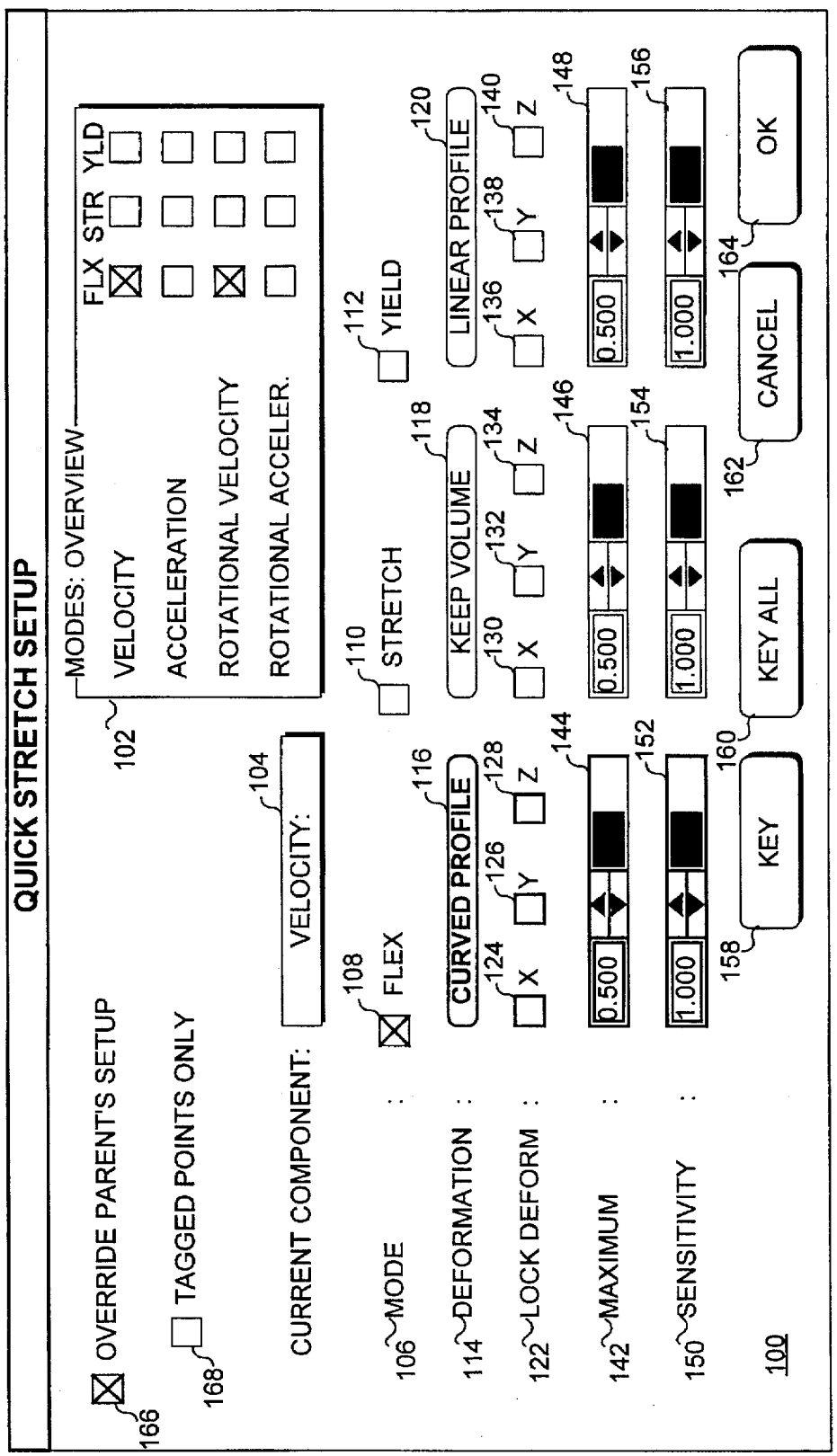
FIG. 6B is a setup dialog box that enables a user to set parameters that determine the deformation of one or more selected graphic objects, in accordance with the present invention.

If the object or one of the control icons is selected, the user will be presented with an option to select a setup dialog box 100 for QSTRETCH, which is shown in FIG. 6B. QSTRETCH setup dialog box 100 includes a modes block 102 that summarizes the deformation effects and motion vector components selected for the current selected object(s) by the user. In this particular Example, the user has chosen to apply a flex deformation to the current object, as a function of its linear velocity and of its rotational velocity. (Note that the term "rotational" and "angular" are used interchangeably throughout this disclosure and the claims that follow.) The current motion component for which parameters are to be set is entered in a text box 104. In this Example, velocity is the current motion component for which parameters will be entered by the user. A Mode line 106 includes a check box 108 for selecting the flex effect (which is checked), a check box 110 for selecting the stretch effect, and a cheek box 112 for selecting the yield effect for the current motion component.

A Deformation line 114 enables a user to set parameters that will affect the selected deformation effect(s) for the current motion component. For example, a text box 116 can be set so that the flex deformation uses either a curved profile, as indicated, or using a linear profile. (The differences between the curved and linear profiles are discussed below.) The stretch effect can be set to a Keep Volume Constant option in a text box 118, or alternatively, can be set to a Free Volume option. Similarly, a text box 120 can be set either for the curved profile or a linear profile in connection with the yield deformation.

By default, deformations are applied to all axes of the object. A Lock Deformation line 122 in the setup enables a user to prevent any deformation effect related to the current motion component from being applied to one or more selected axes. In connection with the flex deformation, check boxes 124, 126, and 128 respectively enable the user to select the X, Y, and/or Z axis to be excluded from the flex deformation. The stretch deformation can be excluded from the X, Y, and/or Z axis by entering a check in one or more of check boxes 130, 132, or 134, respectively. Similarly, under the yield deformation, any of the three orthogonal axes can be selected for exclusion from the effect with a check entered in one or more of check boxes 136, 138, and/or 140.

As noted above, each deformation effect is directly related to a specified motion component. If the linear velocity is selected to control an effect, the faster an object is moving, the greater is the extent to which it is deformed by the effect. However, at some point, an object would typically be expected to reach a maximum deformation, depending upon its stiffness. For this reason, a Maximum line 142 enables the user to separately set the maximum deformation for any of the three effects related to the current motion component in blocks 144, 146, and 148, respectively. If the maximum stretch effect is set to 0.5, an object is allowed to elongate to 1.5 times its initial (undeformed) size. Setting the maximum to 1.0 for the stretch effect enables an object to elongate up to twice its normal (undeformed) size.

Scaling factors applicable to each of the effects are set on a Sensitivity line 150. The values entered within blocks 152, 154, and 156 in this line, for the flex, stretch, and yield effects, determine how sensitive each of these deformation effects will be relative to the current object's motion component. A default value of 1.0 is used for each effect, but can be readily changed by the user to other values to make a specific effect either more or less sensitive.

The maximum values entered in Maximum line 142 and the scaling values entered in Sensitivity line 150 can be animated so that the parameters change over time as an object appears in successive frames. A Key button 158 is included to create a key frame that is applicable only to the parameters of the selected effects related to the current motion component. The user can selectively move a timeline pointer (not shown) to other frames in an animation without exiting the QSTRETCH setup dialog box to enter different values to create a changing deformation function that is applied to an object. A Key All button 160 is included for creating a key frame for the active parameters of all motion components applicable to an object. A Cancel button 162 and an OK button 164 are included at the bottom of the QSTRETCH setup dialog box to respectively cancel any parameters entered without removing an animation already key framed, or to accept the values entered and/or create QSTRETCH information for the selected objects.

As noted above, the user can optionally override the QSTRETCH setup parameters applied to a parent object for which the currently selected object is a child. A check entered within a check box 166 causes the object to deform as if it were a node without any parent, regardless of whether the parent has the QSTRETCH function applied to it or not. If check box 166 is not selected, the parent object's QSTRETCH setup (if any) is used instead, and the deformation is performed considering all of the object's control vertices, relative to the parent object's center. This parent-child relationship continues up the hierarchy of objects, until the first object with its own QSTRETCH setup is encountered.

A check box 168 is included to enable the user to apply the QSTRETCH deformation effects to selected (i.e., tagged) control vertices only. If chosen, this options will cause the QSTRETCH module to only deform the selected control vertices of the object, which can have a substantial impact on the resulting deformed object.

Once the user has determined the QSTRETCH setup parameters that will be used to define a deformed object as described above, the system can determine the effect offsets for each of the control vertices of the object and the data can be stored on the hard drive or other nonvolatile storage device to facilitate rendering of the deformed object during the animation. It is generally preferable to apply each deformation effect to an object separately, so that the effect can be viewed and fine tuned. Thereafter, multiple deformation effects can be combined to achieve a result that is more likely to be as expected.

Mathematical Development of Deformations as a Function of Motion Vectors

Throughout the remaining discussion, certain symbols are used to mathematically disclose how each type of deformation effect is determined, for each of the variations that can be selected by the user. These symbols are defined as follows. The vertex of an object (in coordinates local to the center of this object) is represented by $\vec{p}$. Following a deformation of the object in accordance with the present invention, the vertex is represented by a new value, $\vec{p}'$, i.e., the deformed value of the original vertex. The term "vertex" actually refers to a vector that extends from the center of an object to a specific control vertex on the surface of the object. Although not shown in the following examples, this center point can be shifted by the user to other positions, to control how the deformation affects the object. The radius of the object's bounding sphere is represented by the term r. A kinetic vector (i.e., velocity or acceleration—linear or angular) applied to the center of the object is represented by the term $\vec{k}$. A given type of deformation, e.g., a flex deformation with a curved profile, is represented by the term d. A scalar value representing the sensitivity controlling the amplitude of the deformation d is represented by the term $s_d$. A scalar representing the maximum deformation rate applied to a vertex for a given type of deformation d is represented by the term $m_d$. Generally, $m_d$ ranges from 0 (no deformation) to 1 (deformation equal to $\|\vec{p}\|$) but can also be greater, to produce an even larger deformation.

To define a bound version $\vec{k}'$ of the kinetic vector $\vec{k}$ that will allow a deformation rate at most equal to $m_d$, set $$m_d' = \frac{m_d}{|s_d|}.$$

Then a new vector $\vec{k}'$ can be defined as follows:

$$\text{if } \|\vec{k}\| > m_d' \text{ then } \vec{k}' = \frac{m_d'}{\|\vec{k}\|} \vec{k} \text{ else } \vec{k}' = \vec{k} \tag{1}$$

The amplitude of the product $\vec{k}_i' s_d$ is bounded by $m_d \vec{k}_i / \|\vec{k}\|$, and the product $\|\vec{k}'\| s_d$ is bounded by $m_d$. A typical deformation equation for each coordinate i∈{x,y,z} of the vertex $\vec{p}$ has the form:

$$\vec{p}_i' = \vec{p}_i + [\ldots] \vec{k}_i' s_d \tag{2}$$

Thus, the length of the deformation vector that is added to the vertex $\vec{p}$ is bounded to $m_d$ times the value of the rest of Equation (2) (i.e., times the term(s) in the square brackets).

For a given kinetic vector $\vec{k}$ and a given vertex $\vec{p}$, a unit vector $\vec{u}$ is defined by:

$$\vec{u} = \frac{\vec{u}'}{\|\vec{u}'\|} \tag{3}$$

where $$\vec{u}' = \vec{k} \frac{(\vec{p} \cdot \vec{k})}{\|\vec{k}\|^2} - \vec{p}.$$

Geometrically, $\vec{u}$ is a unit vector perpendicular to $\vec{k}$, in the same plane as $\vec{p}$ and $\vec{k}$, and on the same side as $\vec{p}$ relative to $\vec{k}$. The relationships of these vectors to orthogonal axes x, y, and z are shown in FIG. 5.

Flex Deformation

The flex deformation simulates the deformation of an object produced by friction that its environment applies upon the surface of the object. When a flexible object is moving rapidly in one direction (with a linear velocity or acceleration), it appears to bend or flex in the direction opposite to its movement, due to the resistance of the air. In the same way, when a flexible object rotates (with an angular velocity or acceleration), it appears to twist around its axis of rotation.

For each coordinate i∈{x,y,z} of vertex $\vec{p}$, a linear profile of the flex deformation produced by the linear velocity or acceleration can be computed using:

$$\vec{p}_i' = \vec{p}_i - 0.5773 \vec{p} \cdot \vec{u} (|\vec{u}_x| + |\vec{u}_y| + |\vec{u}_z|) \vec{k}_i' s_d \tag{4}$$

where $\vec{p} \cdot \vec{u}(|\vec{u}_x| + |\vec{u}_y| + |\vec{u}_z|)$ indicates that the deformation is proportional to the linear sum of the absolute value of the coordinates of the vector $(\vec{p} \cdot \vec{u})\vec{u}$. The term $\vec{k}_i'$ forces the deformation to occur only in the direction of the kinetic vector. The linear sum of the coordinates in the first factor insures that the deformation is linear. In addition, the absolute value of these coordinates is used so that the deformation always occurs in the same direction, whatever the sign of the coordinates for the different vertices of the object may be.

The vaue 0.5773 in Equation (4) insures that the amplitude of the first factor is at most equal to the length of the vertex that is to be deformed. This value was selected, based on the following reasoning. First, the sum $$\sum_i |\vec{u}_i|$$

is maximized when $\vec{u}_x = \vec{u}_y = \vec{u}_z$. Since $\vec{u}$ is a unit vector, the following is true:

$$\vec{u}_x^2 + \vec{u}_y^2 + \vec{u}_z^2 = 1 \tag{5}$$

From the foregoing, it will be apparent that:

$$|\vec{u}_i| \cong 0.5773 \tag{6}$$

therefore requiring division by:

$$\sum_i |\vec{u}_i| \cong 1.732 \tag{7}$$

so that the amplitude of deformation is at most equal to the length of the vertex.

Figure 7:
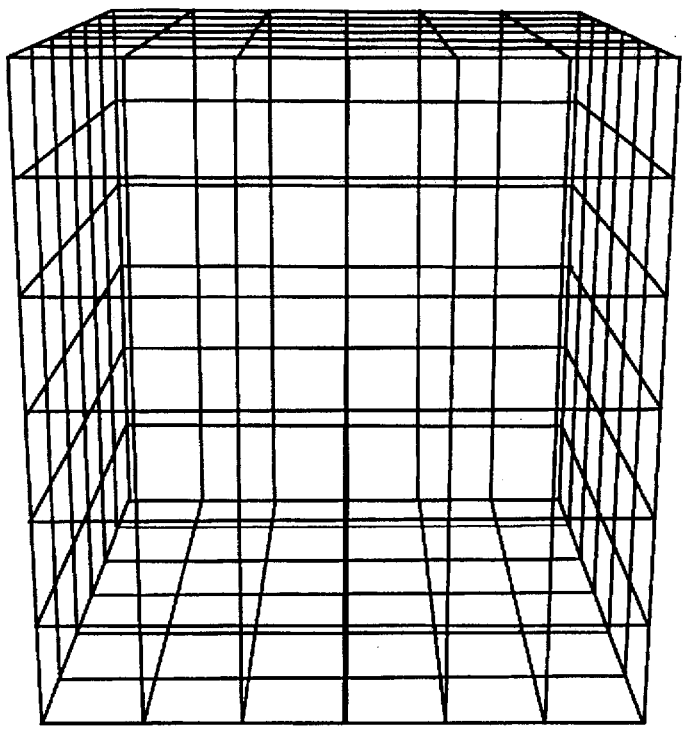
FIG. 7 is a wire frame representation of a 3D cube at rest (undeformed)
Figure 8:
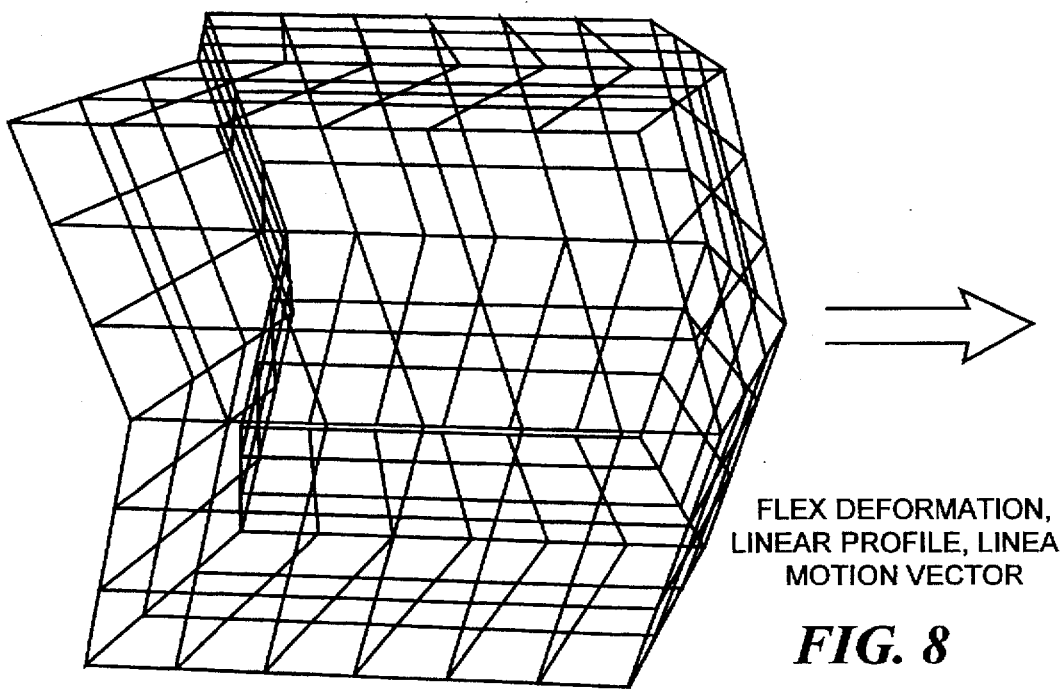
FIG. 8 illustrates the flex deformation of the wire frame representation of the cube, using a linear profile, as a function of a linear motion vector that defines the cube's motion.

FIG. 7 shows a wire frame representation of a static (non-moving) cube, as it appears without any deformation. In contrast, FIG. 8 shows how the same cube will appear when the flex deformation—linear profile is applied to it, in reaction to its linear motion.

Figure 9:
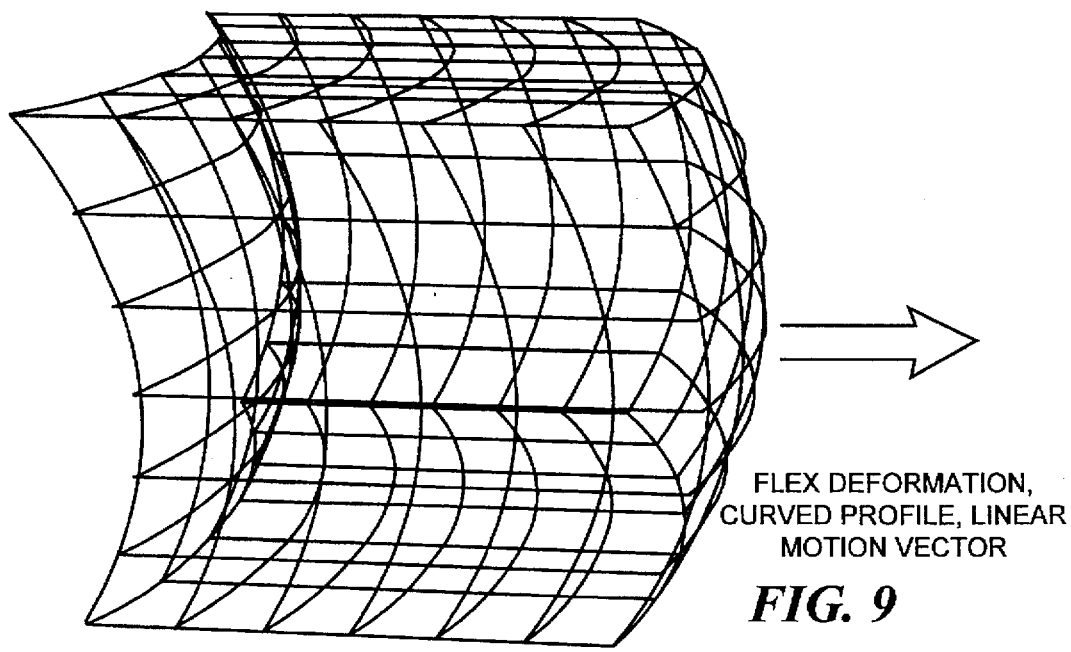
FIG. 9 illustrates the flex deformation of the wire frame representation of the cube, using a curved profile, as a function of a linear motion vector that defines the cube's motion.

In regard to the flex deformation with a curved profile, for each coordinate $i \in \{x,y,z\}$ of vertex $\vec{p}$, the flex deformation produced by the object's linear velocity or acceleration is determined using:

$$\vec{p}_i' = \vec{p}_i - \frac{(\vec{p} \cdot \vec{u})^2}{r} \vec{k}_i' s_d \tag{8}$$

where the deformation is proportional to the square of the distance between the vertex and the kinetic vector $(\vec{p} \cdot \vec{u})^2$. The value r insures that the amplitude of the first factor is at most equal to the length of the vertex to deform, and the vector $\vec{k}_i'$ forces the deformation to occur only in the direction of the kinetic vector. FIG. 9 shows how the cube moving with a linear velocity or acceleration will appear when the flex deformation is applied with the curved profile.

The flex deformation in response to angular velocity/acceleration involves rotating each vertex around the kinetic vector. The amount of rotation is proportional to the square of the distance from the vertex to the kinetic vector (for the linear profile), or proportional to the length of the vertex (for the curved profile). This rotation results in an object that appears to twist around the kinetic vector. A rotation of $\pi$ radians for a vertex is mapped to the maximum deformation rate $m_d = 1$.

For the linear profile deformation, the angle $\theta$ by which each vertex is rotated to deform the object is computed using:

$$\theta = -\left(\frac{\vec{p} \cdot \vec{u}}{r}\right)^2 \pi \|\vec{k}'\| s_d \tag{9}$$

where $$\left(\frac{\vec{p} \cdot \vec{u}}{r}\right)^2$$

allows the angular displacement of the vertex to be proportional to the square of the normalized distance of this vertex from the kinetic vector, and $\pi$ allows an angular displacement of at most $\pi$ radians.

Figure 10:
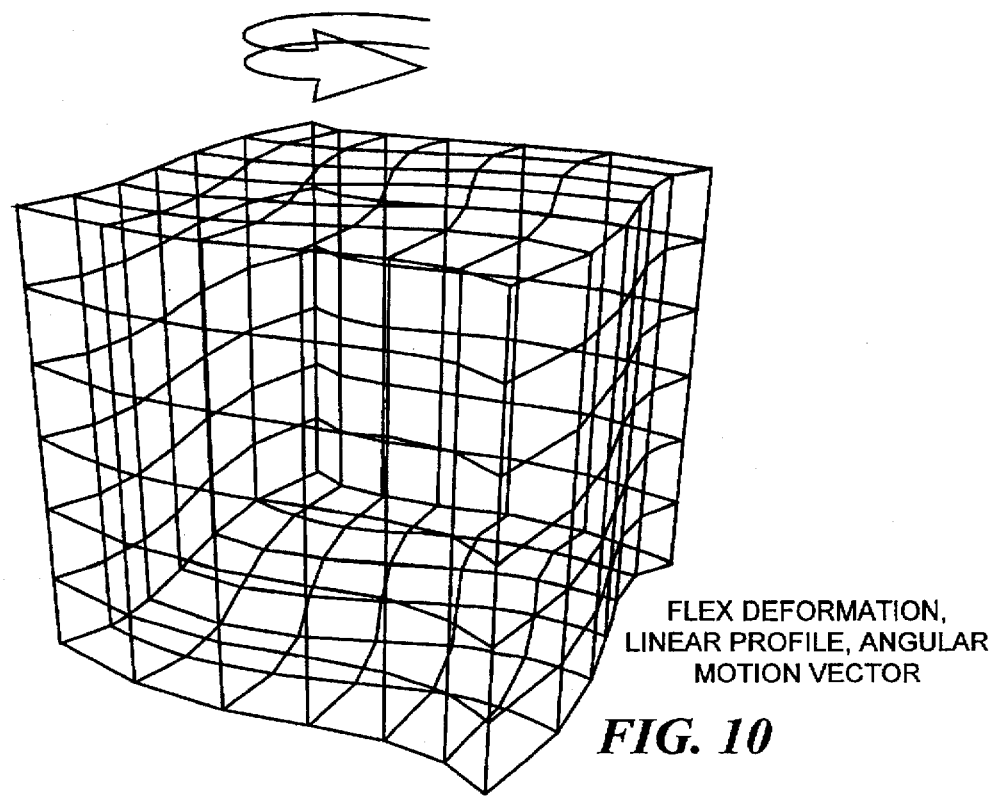
FIG. 10 illustrates the flex deformation of the wire frame representation of the cube, using a linear profile, as a function of an angular or rotational motion vector that defines the cube's motion.

The square in the first factor results in a very small displacement for vertices that are very close to the kinetic vector, in contrast to a maximum displacement applied to vertices that are close to the limit of the object's bounding sphere. This nonlinear progression in angular displacement is used so the object doesn't look like it is turning around the kinetic vector. Instead, it appears to be deformed around this vector. The new position of the vertex when the linear profile of the flex deformation is applied is defined by:

$$\vec{p}' = \vec{p} R_{\vec{x}}(\theta) \tag{10}$$

where $R_{\vec{x}}(\theta)$ rotates the vertex by an angle of $\theta$ radians around the kinetic vector. In FIG. 10, the flex deformation of the wire frame cube is shown with a linear profile in response to angular velocity or acceleration.

The only difference between the curved profile and the linear profile in response to angular motion arises from the way the angular displacement $\theta$ is determined. The following equation is used to determine $\theta$ for the curved profile:

$$\theta = -\left(\frac{\|\vec{p}\|}{r}\right)^2 \pi \|\vec{k}'\| s_d \tag{11}$$

Figure 11:
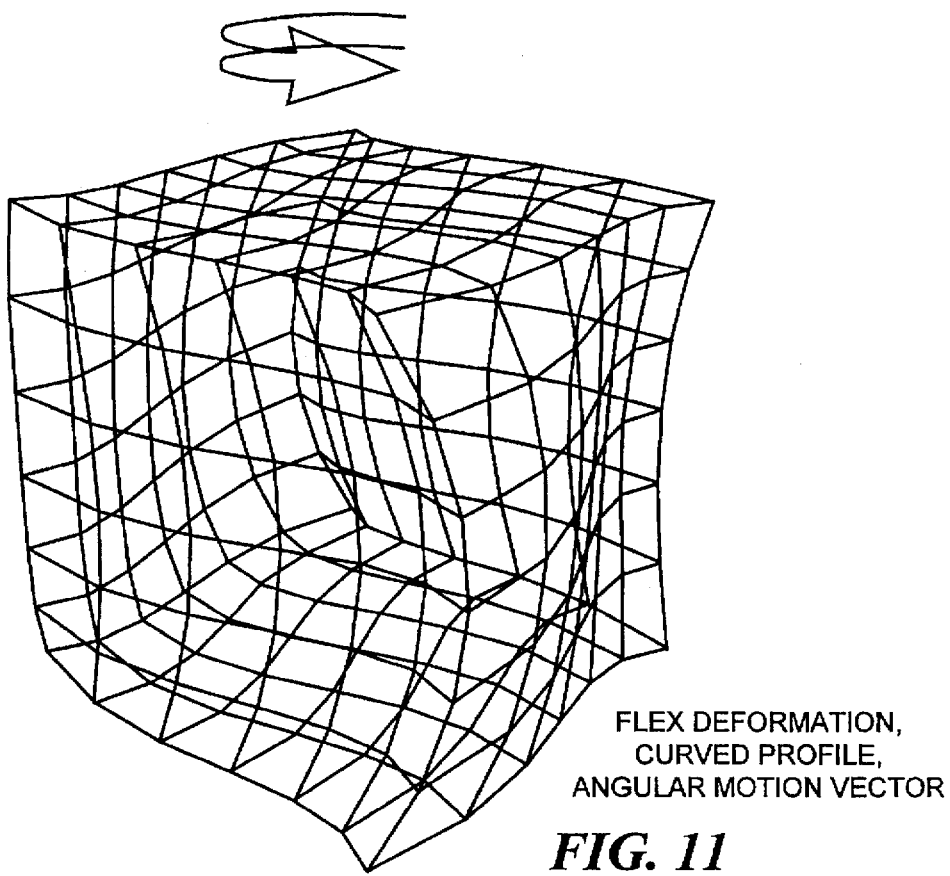
FIG. 11 illustrates the flex deformation of the wire frame representation of the cube, using a curved profile, as a function of an angular motion vector that defines the cube's motion.

Consider the set of vertices lying on a linear edge of an object, with the edge parallel to the kinetic vector. The variation of the length of these vertices, from one vertex to the other, is nonlinear (as opposed to the distance of those vertices from the kinetic vector, which is used in the linear profile). This factor will then produce a nonlinear deformation of the vertices. FIG. 11 shows how the cube appears when subject to flex deformation with the curved profile, in response to an angular velocity or acceleration motion component.

Stretch Deformation

Stretch deformation simulates the manner in which the inertia of a moving object contributes to elongate the object. When an object is pulled in one direction (causing a linear velocity or acceleration of the object), it will often elongate in this direction. If the object is pushed, then it will elongate in the perpendicular directions. This deformation corresponds to the well-known "squash and stretch" effect.

On the other hand, when an object is rotated (so that it has an angular velocity or acceleration), it appears to elongate either away from the axis of rotation, or along the axis of rotation. The deformation produced by angular motion corresponds to one component of the centrifugal force, for the former case, and one component of the centripetal force, for the latter case.

The stretch deformation of an object with volume conservation produced by its linear velocity or acceleration is exhibited both in the direction of the kinetic vector and in the plane perpendicular to this vector. Increasing the dimension of the object in one direction (stretching) is coupled with a decrease of the dimension in orthogonal directions (shrinking) so that the volume of the object is kept constant. In contrast, deformation without volume conservation (i.e., free volume) occurs either in the kinetic vector direction or in the plane perpendicular to this vector.

For an object having an original dimension $D_{\vec{d}}$, in a given direction $\vec{d}$, a scaling factor $f_{\vec{d}} \in [-1,1]$ is applied in this direction as a reaction to a kinetic vector. The new dimension of the object in this direction can be expressed as a function of the kinetic vector:

$$D_{\vec{d}}' = D_{\vec{d}} + f_{\vec{d}} D_{\vec{d}} \| \vec{k}' \| s_d \quad (12)$$

The same scaling factor is applied to all vertices of the object using an equation of the form:

$$\vec{p}' = \vec{p} + f_{\vec{d}} F(\vec{p}, \vec{d}) \| \vec{k}' \| s_d \quad (13)$$

where $F(\vec{p}, \vec{d})$ has a value of at most $\|\vec{p}\|$, depending on the direction of $\vec{p}$ relatively to $\vec{d}$. Next, assume that this scaling is applied in three orthogonal directions $\vec{d}_1, \vec{d}_2, \vec{d}_3$. To keep the product of the dimensions of the object in those three directions constant, for $\vec{d} \in \{\vec{d}_1, \vec{d}_2, \vec{d}_3\}$, three scaling factors $f_{\vec{d}}$ must be found so that:

$$\prod_{\vec{d}} D_{\vec{d}}' = \prod_{\vec{d}} D_{\vec{d}} = \prod_{\vec{d}} (D_{\vec{d}} + f_{\vec{d}} D_{\vec{d}} \|\vec{k}'\| s_d) \quad (14)$$

and thus:

$$\prod_{\vec{d}} (1 + f_{\vec{d}} \|\vec{k}'\| s_d) = 1 \quad (15)$$

If the sensitivity factor is positive, the object is stretched in the direction of the kinetic vector by a scaling factor that is fixed at 1, and is shrunk in the plane perpendicular to this vector. The scaling factors for the two directions perpendicular to the kinetic vector will be equal. For a positive sensitivity factor, the stretch deformation with volume conservation produced by the linear velocity or acceleration for each coordinate $i \in \{x,y,z\}$ of vertex $\vec{p}$ is computed using:

$$\vec{p}_i' = \vec{p}_i + f_{\vec{k}}^+ \vec{k}_i' \frac{(\vec{p} \cdot \vec{k})}{\|\vec{k}\|} s_d + f_{\vec{u}}^- \vec{u}_i (\vec{p} \cdot \vec{u}) \|\vec{k}'\| s_d \quad (16)$$

where $$\vec{k}_i' \frac{(\vec{p} \cdot \vec{k})}{\|\vec{k}\|}$$

insures that the scaling factor $f_{\vec{k}}^+$ is applied only in the direction of the kinetic vector, with an amplitude proportional to the part of the vertex which is in this direction, and $\vec{u}_i (\vec{p} \cdot \vec{u})$ insures that the scaling factor $f_{\vec{u}}^-$ is applied only in the direction perpendicular to the kinetic vector, with an amplitude proportional to the component of the vertex that extends in this direction. Consequently, if the vertex is parallel to the kinetic vector, the first term added to the vertex has an amplitude of at most $\|\vec{p}\|$ times $f_{\vec{k}}^+ \|\vec{k}'\| s_d$. If the vertex is perpendicular to the kinetic vector, the second term added to the vertex also has an amplitude of at most $\|\vec{p}\|$ times $f_{\vec{u}}^- \|\vec{k}'\| s_d$.

If $f_a$ is defined as $f_{\vec{k}}^+ \|\vec{k}'\| s_d$, $f_b$ is defined as $f_{\vec{u}}^- \|\vec{k}'\| s_d$, and if $f_{\vec{k}}^+$ is fixed to 1, then a value must be found for $f_b$ such that the volume of the object is held constant, i.e.,:

$$(1+f_a)(1+f_b)(1+f_b) = 1 \quad (17)$$

Accordingly, it is determined that:

$$f_b = -1 \pm \frac{1}{\sqrt{1+f_a}} \quad (18)$$

Figure 12:
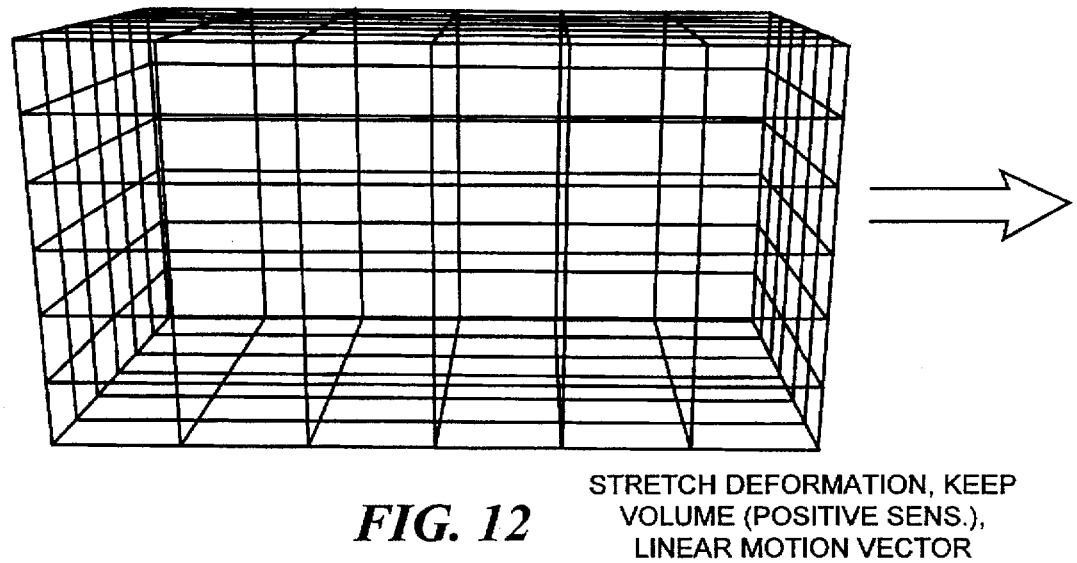
FIG. 12 illustrates the stretch deformation of the wire frame representation of the cube, keeping the volume of the cube constant, with a positive sensitivity, determined as a function of a linear motion vector that defines the cube's motion.

The negative case (for the "$\pm$" term) in Equation (18) is not retained since $f_{\vec{u}}^-$ must be in the range $[-1, 1]$. FIG. 12 shows the stretch deformation of the wire frame representation of the cube, while maintaining a constant volume and with positive sensitivity, in response to a linear velocity or acceleration component.

If the sensitivity factor is negative, the object is shrunk in the direction of the kinetic vector, and is stretched in the plane perpendicular to this vector. FIG. 13 shows how the negative sensitivity changes the result for the stretch deformation from that shown for a positive sensitivity in FIG. 12. As is true when the sensitivity is positive, the scaling factors for the two directions perpendicular to the kinetic vector will be equal when the sensitivity is negative, but will be fixed to 1. For a negative sensitivity factor, the stretch deformation with volume conservation produced by the linear velocity or acceleration of an object is computed for each coordinate $i \in \{x,y,z\}$ of vertex $\vec{p}$, using:

$$\vec{p}_i' = \vec{p}_i + f_{\vec{k}}^- \vec{k}_i' \frac{(\vec{p} \cdot \vec{k})}{\|\vec{k}\|} |s_d| + f_{\vec{u}}^+ \vec{u}_i (\vec{p} \cdot \vec{u}) \|\vec{k}'\| s_d \quad (19)$$

Except for the absolute value of the sensitivity factor, $|s_d|$, Equation (19) is identical to Equation (16), which was used for the positive sensitivity factor. The value of $f_a$ is now defined as $f_{\vec{k}}^- \|\vec{k}'\| s_d$, and the value of $f_b$ is defined as $f_{\vec{u}}^+ \|\vec{k}'\| s_d$. Since $f_{\vec{u}}^+$ is fixed to 1, a value for $f_a$ must be determined such that volume of the object is held constant, i.e., so that $$(1+f_a)(1+f_b)(1+f_b) = 1 \quad (20)$$

The following equation meets this condition:

$$f_a = \frac{-f_b^2 - 2f_b}{f_b^2 + 2f_b + 1} \quad (21)$$

Figure 15:
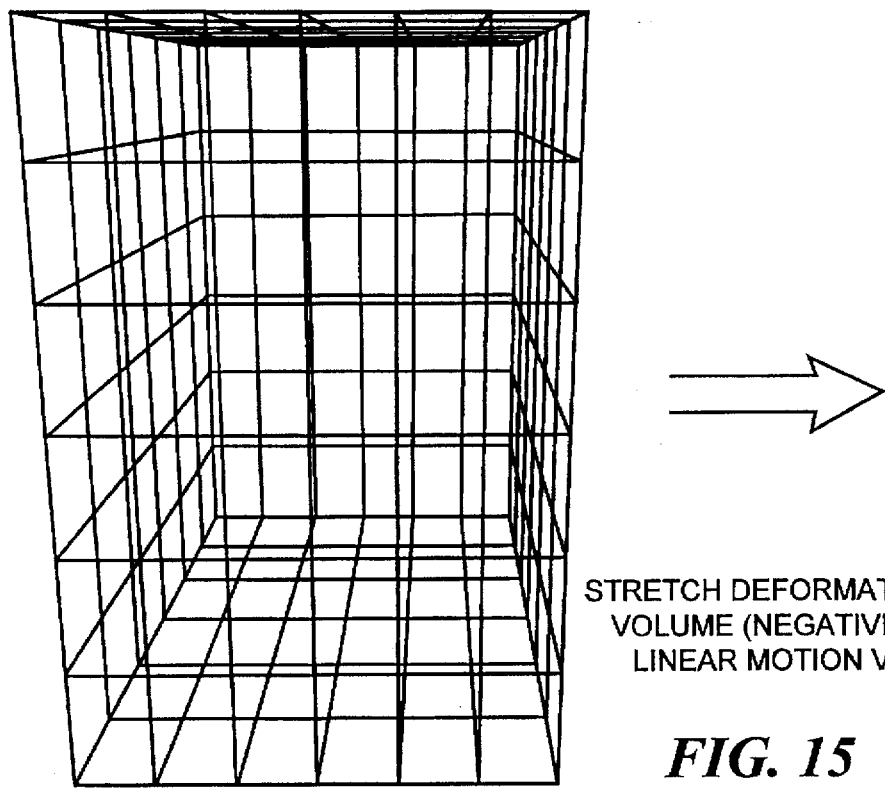
FIG. 15 illustrates the stretch deformation of the wire frame representation of the cube, allowing the volume of the cube to freely change, with a negative sensitivity, determined as a function of a linear motion vector that defines the cube's motion.

When the free volume option is chosen, the stretch deformation occurs only in the direction of the kinetic vector (for a positive sensitivity) or in the plane perpendicular to this vector (for a negative sensitivity). (See FIGS. 14 and 15, respectively.) For a positive sensitivity, the deformation is determined in the same manner as the deformation for positive sensitivity with the keep constant volume option, but with $f_{\vec{k}}^+$ fixed to 1 and $f_{\vec{u}}^-$ fixed to 0. For each coordinate $i \in \{x,y,z\}$ of vertex $\vec{p}$ the deformation is computed using:

$$\vec{p}_i' = \vec{p}_i + \vec{k}_i' \frac{(\vec{p} \cdot \vec{k})}{\|\vec{k}\|} s_d \quad (22)$$

The deformation for negative sensitivity occurs only in the plane perpendicular to the kinetic vector direction and is calculated like the deformation for positive sensitivity, with the keep volume constant option, but with $f_{\vec{k}}^-$ fixed to 0 and $f_{\vec{u}}^+$ fixed to 1. For each coordinate $i \in \{x,y,z\}$ of vertex $\vec{p}$, the deformation is computed using:

$$\vec{p}_i' = \vec{p}_i + \vec{u}_i (\vec{p} \cdot \vec{u}) \|\vec{k}'\| s_d \quad (23)$$

Figure 16:
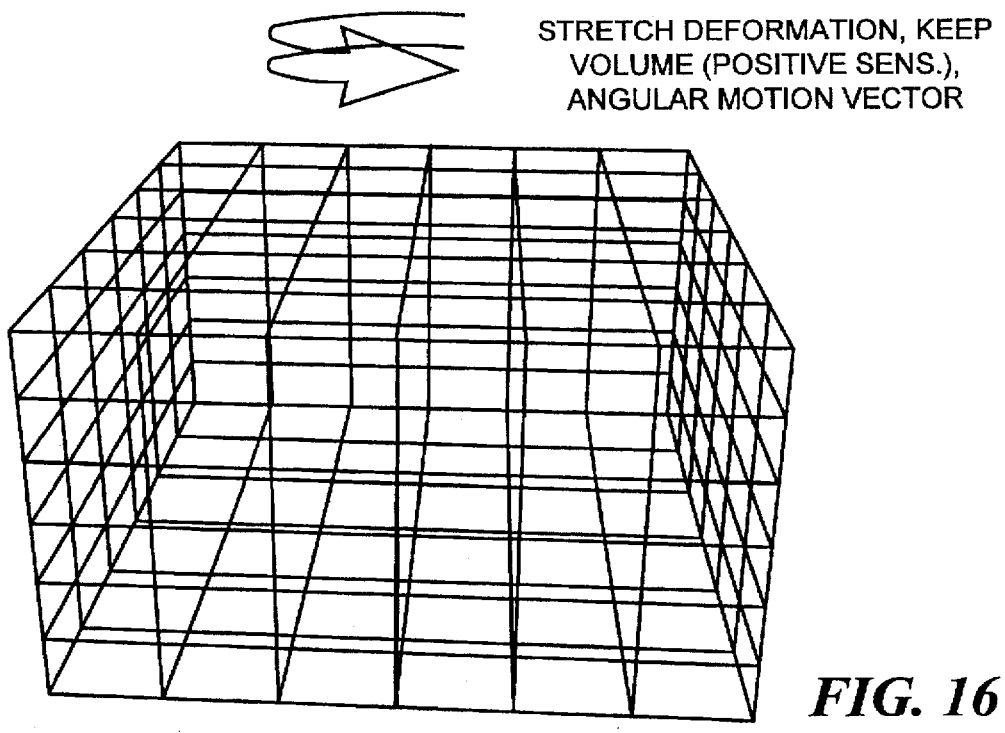
FIG. 16 illustrates the stretch deformation of the wire frame representation of the cube, keeping the volume of the cube constant, with a positive sensitivity, determined as a function of an angular motion vector that defines the cube's motion.
Figure 17:
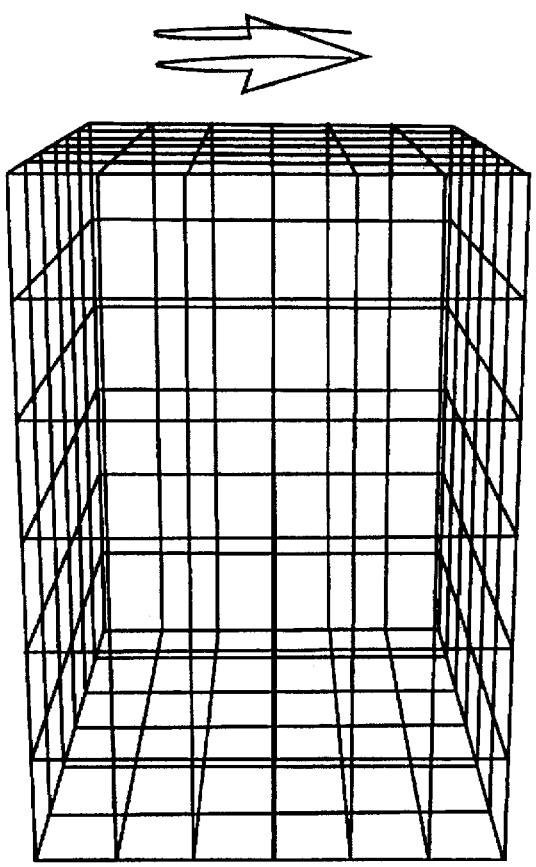
FIG. 17 illustrates the stretch deformation of the wire frame representation of the cube, keeping the volume of the cube constant, with a negative sensitivity, determined as a function of an angular motion vector that defines the cube's motion.
Figure 18:
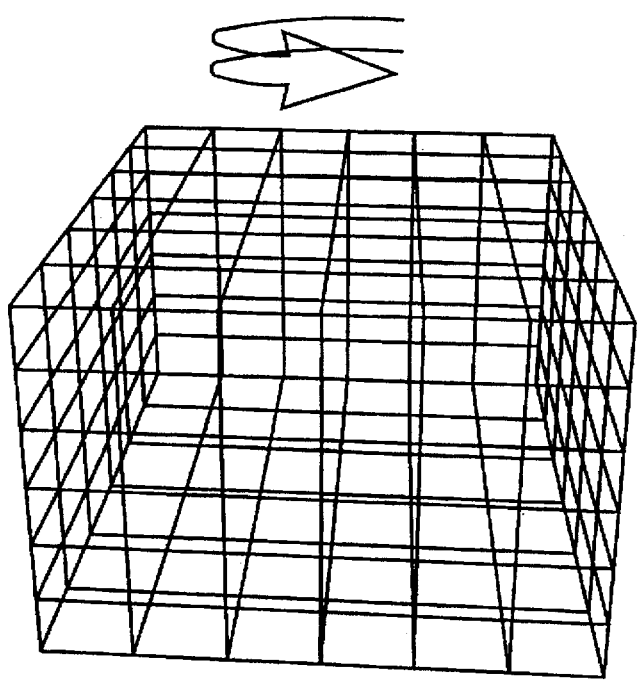
FIG. 18 illustrates the stretch deformation of the wire frame representation of the cube, allowing the volume of the cube to freely change, with a positive sensitivity, determined as a function of an angular motion vector that defines the cube's motion.
Figure 19:
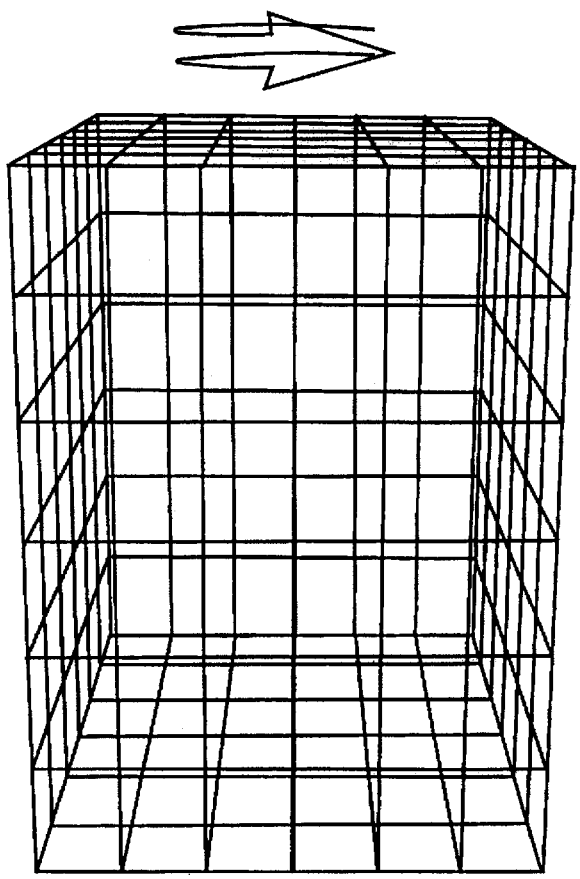
FIG. 19 illustrates the stretch deformation of the wire frame representation of the cube, allowing the volume of the cube to freely change, with a negative sensitivity, determined as a function of an angular motion vector that defines the cube's motion.

The stretch deformation of an object subject to angular velocity or acceleration is the same as the deformation produced by linear velocity or acceleration, except that positive and negative sensitivity are interchanged. For this reason, only the result equations are included below. FIG. 16 illustrates the wire frame cube as it appears when stretch deformation is applied, with the keep volume constant option selected and with positive sensitivity, in response to angular motion components. Similarly, FIGS. 17, 18, and 19 respectively show the effects of stretch deformation with constant volume (negative sensitivity), free volume (positive sensitivity), and free volume (negative sensitivity).

The following discussion relates to the stretch deformation with keep volume constant (positive sensitivity), in response to angular velocity/acceleration. For each coordinate $i \in \{x,y,z\}$ of vertex $\vec{p}$, the deformation is computed using:

$$\vec{p}_i' = \vec{p}_i + f_k \vec{k}_i' \frac{(\vec{p} \cdot \vec{k})}{\|\vec{k}\|} s_d + f_u \vec{u}_i (\vec{p} \cdot \vec{u}) \|\vec{k}\| s_d \quad (24)$$

where $f_{\vec{u}}$ is fixed to 1 and $$f_a = \frac{-f_b^2 - 2f_b}{f_b^2 + 2f_b + 1}$$

for $f_a = f_{\vec{k}} \|\vec{k}'\| s_d$ and $f_b = f_{\vec{u}} \|\vec{k}'\| s_d$.

In the case of negative sensitivity, for each coordinate $i \in \{x,y,z\}$ of vertex $\vec{p}$, the deformation is computed using:

$$\vec{p}_i' = \vec{p}_i + f_k \vec{k}_i' \frac{(\vec{p} \cdot \vec{k})}{\|\vec{k}\|} |s_d| + f_u \vec{u}_i (\vec{p} \cdot \vec{u}) \|\vec{k}\| s_d \quad (25)$$

where $f_{\vec{k}}$ is fixed to 1 and $$f_b = -1 + \frac{1}{\sqrt{1 + f_a}}$$

if $f_a = f_{\vec{k}} \|\vec{k}'\| |s_d|$ and $f_b = f_{\vec{u}} \|\vec{k}'\| |s_d|$.

In the case where free volume and positive sensitivity are selected, for each coordinate $i \in \{x,y,z\}$ of vertex $\vec{p}$, the deformation is computed as follows:

$$\vec{p}_i' = \vec{p}_i + \vec{u}_i (\vec{p} \cdot \vec{u}) \|\vec{k}\| s_d \quad (26)$$

In the case of free volume and negative sensitivity, for each coordinate $i \in \{x,y,z\}$ of vertex $\vec{p}$, the deformation is computed using:

$$\vec{p}_i' = \vec{p}_i + \vec{k}_i' \frac{(\vec{p} \cdot \vec{k})}{\|\vec{k}\|} |s_d| \quad (27)$$

Yield Deformation

Depending on the composition of an object, the internal mass of a moving flexible object may be displaced along the direction of the object's motion, causing a bulge to appear at one end, while the other end shrinks inwardly. Similarly, when an object rotates, its internal mass tends to be pulled away from its rotational axis, but may also be attracted towards this axis (e.g., due to gravity). This deformation therefore at least in part simulates the centrifugal force (in regard to the former case) or the centripetal force (in regard to the latter case).

The yield deformation of a vertex of an object produced by a linear velocity or acceleration of the object is a displacement of this vertex in the plane perpendicular to the kinetic vector followed by the object. Vertices that are on the front of the object (relative to the direction of its displacement) will tend to move closer to the kinetic vector, unlike the vertices that are at the back of the object, which will tend to move away from the kinetic vector. This change in the shape of the object creates the impression that the object's internal mass is moving towards the back of the object.

Figure 20:
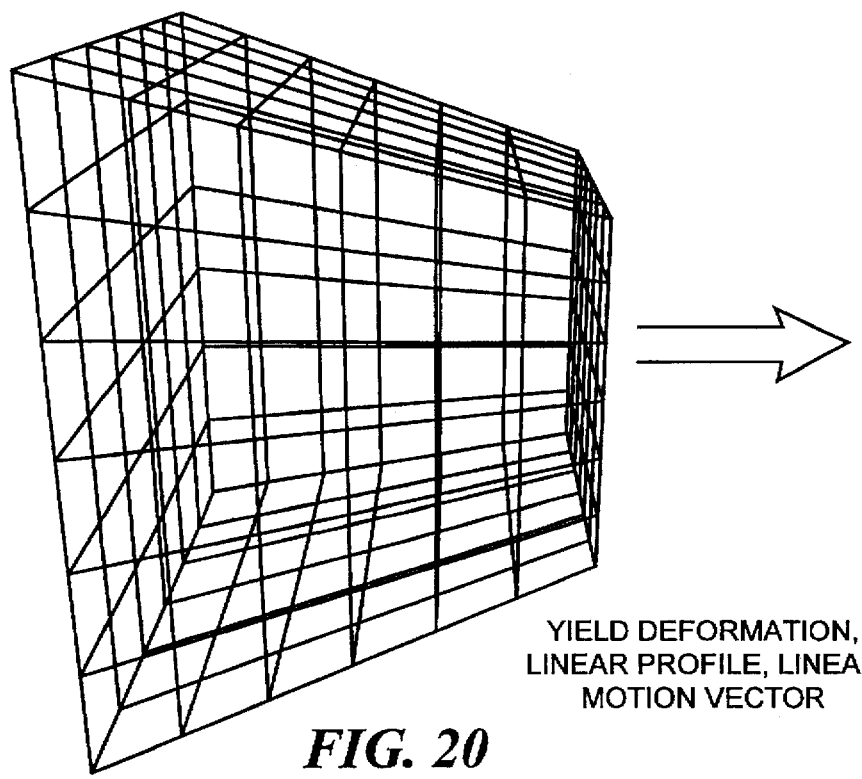
FIG. 20 illustrates the yield deformation of the wire frame representation of the cube, using a linear profile, as a function of a linear motion vector that defines the cube's motion.

For each coordinate $i \in \{x,y,z\}$ of vertex $\vec{p}$, the linear profile of yield deformation produced by the linear velocity or acceleration of the object is computed using:

$$\vec{p}_i' = \vec{p}_i - \vec{p} \cdot \vec{u} \frac{(\vec{p} \cdot \vec{k})}{r} \vec{u}_i s_d \quad (28)$$

where $\vec{p} \cdot \vec{u}$ insures that the deformation is greater for vertices that are far from the velocity vector, $$\frac{\vec{p} \cdot \vec{k}}{r}$$

forces the deformation to be greater for vertices that are parallel to the velocity vector, with respect to the sign of this direction, and $\vec{u}_i$ insures that the deformation occurs only in the plane that is orthogonal to the velocity vector. The product of these three factors is at most equal to the product of the length of the vertex that is to be deformed and the kinetic vector. An example of the yield deformation of the wire frame cube with linear profile, due to linear velocity or acceleration is shown in FIG. 20.

To obtain a curved profile for the yield deformation, the linear profile yield deformation is mapped on a parabolic equation. The intention is to determine $y_i(x)$ in the equation:

$$\vec{p}_i' = \vec{p}_i + \vec{p} \cdot \vec{u} (i \, y_i(x) - 1) \vec{u}_i \|\vec{k}\| s_d \quad (29)$$

Suppose that the variable x is the cosine of the angle between the vertex and the kinetic vector, so that $$x = \frac{\vec{p} \cdot \vec{k}}{\|\vec{p}\| \|\vec{k}\|},$$

and that $y_i(x)$ must have a parabolic shape. Then, the relation between x and $y_i$ is determined using $$y_i = \sqrt{f(1-x)}.$$

To solve for the value of f, the deformation of two top corners, A and B, that are symmetrical relative to the center of a cube must have approximately the same deformation (with opposite signs) when the kinetic vector is applied to the center of the cube in a direction parallel to the top of the cube. The cosines of the angles between those points and the kinetic vector are $$x_A = -x_B = -\frac{r}{\sqrt{2}}.$$

Figure 21:
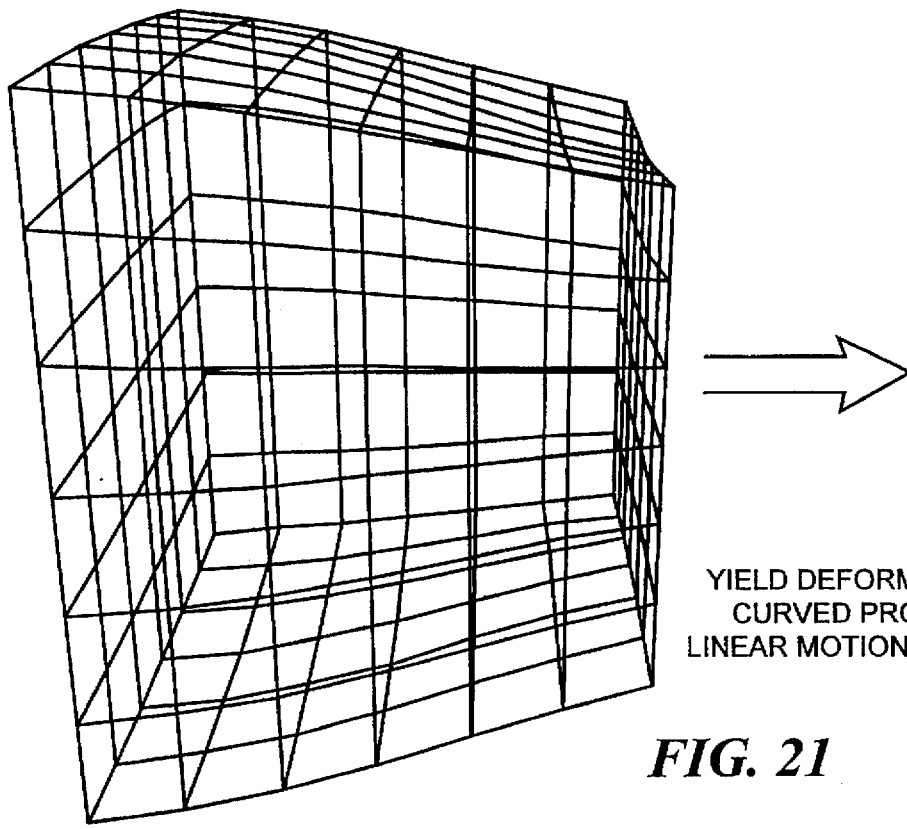
FIG. 21 illustrates the yield deformation of the wire frame representation of the cube, using a curved profile, determined as a function of a linear motion vector that defines the cube's motion.

To achieve the stated condition, $$\sqrt{f(1-x_A)} - 1 = -\sqrt{f(1-x_B)} + 1,$$

and thus, $f \cong 1.1716$. The deformation is then computed using:

$$\vec{p_i'} = \vec{p_i} + \vec{p} \cdot \vec{u} \left( \sqrt{1.1716 \left( 1 - \frac{\vec{p} \cdot \vec{k'}}{\|\vec{p}\|\|\vec{k'}\|} \right)} - 1 \right) \vec{u_i} \|\vec{k'}\| s_d \quad (30)$$

where $\vec{p} \cdot \vec{u}$ insures that the deformation is greater for vertices that are far from the kinetic vector, $$\sqrt{1.1716 \left( 1 - \frac{\vec{p} \cdot \vec{k'}}{\|\vec{p}\|\|\vec{k'}\|} \right)} - 1$$

gives a parabolic shape to the deformation, as a function of the angle between the vertex and the kinetic vector, and $\vec{u_i}$ insures that the deformation occurs only in the plane that is orthogonal to the kinetic vector. FIG. 21 illustrates the wire frame cube as it appears when the yield deformation is applied with the curved profile option set, in response to linear velocity or acceleration.

For angular velocity/acceleration, the yield deformation of a vertex occurs in the direction of the kinetic vector. This deformation creates the impression that the object's mass is moving away from the axis of rotation (if sensitivity is positive) or closer to it (if sensitivity is negative). Only a curved profile exists for this type of deformation, since a linear profile does not correspond to any intuitive effect in the physical world.

Figure 22:
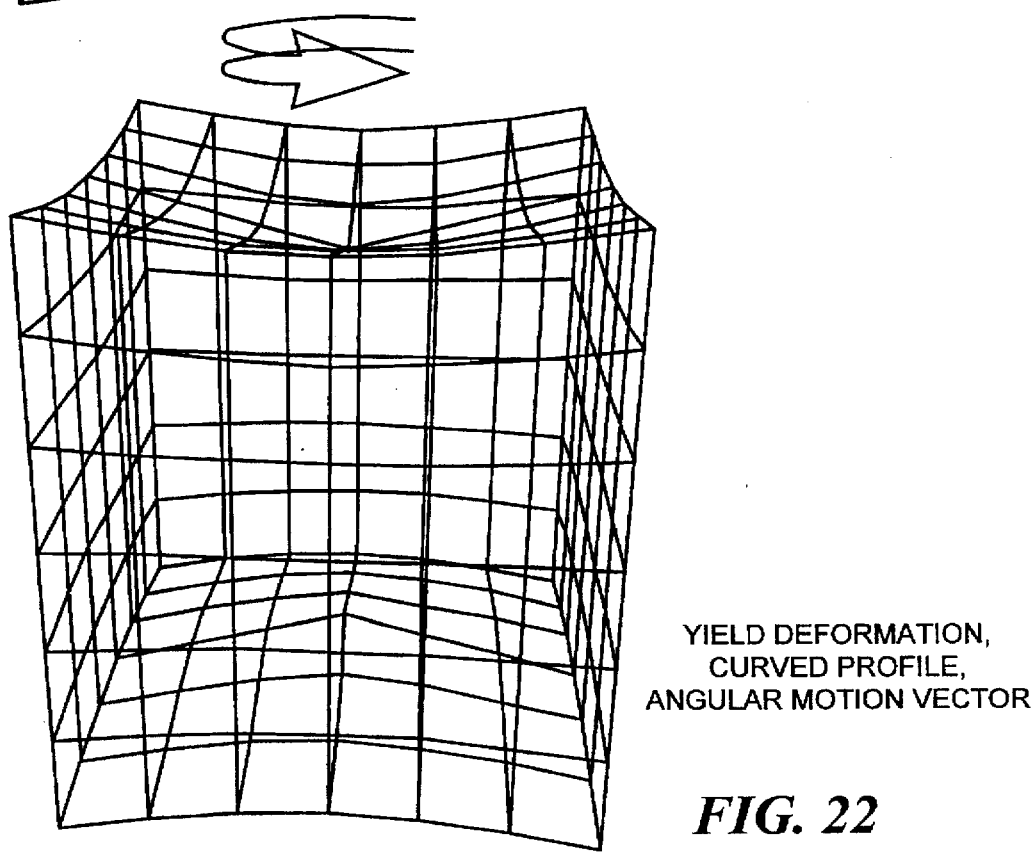
FIG. 22 illustrates the yield deformation of the wire frame representation of the cube, using a curved profile, determined as a function of an angular motion vector that defines the cube's motion.

For each coordinate $i \in \{x,y,z\}$ of vertex $\vec{p}$, the curved profile of yield deformation produced by angular velocity or acceleration is computed using:

$$\vec{p_i'} = \vec{p_i} + \frac{2}{r\|\vec{k'}\|} \vec{p} \cdot \vec{k'} \left( \|\vec{p} \cdot \vec{u}\| - \frac{r}{2} \right) \vec{k_i'} s_d \quad (31)$$

where $\vec{p} \cdot \vec{k'}$ insures that the deformation has a maximum amplitude when the vertex is aligned with the kinetic vector and $(\|\vec{p} \cdot \vec{u}\| - r/2)$ establishes the relationship between amplitude of deformation and the distance of the vertex from the motion vector. The closer the vertex is to the kinetic vector (with a distance smaller than $r/2$), the greater is the amplitude of the deformation (negative). Conversely, the further the vertex is from the kinetic vector (with a distance greater than $r/2$), the greater is the amplitude of the deformation (positive). The term $$\frac{2}{r\|\vec{k'}\|}$$

insures that the product of the previous two described factors is at most equal to the length of the vertex to be deformed, and $\vec{k_i}$ forces the deformation to occur only in the direction of the kinetic vector. An example of the curved profile yield deformation of the wire frame cube as a function of angular velocity or acceleration is shown in FIG. 22.

As mentioned above, the flex, stretch and yield deformations can be combined to produce even more interesting effects for animated objects. Any of these three types of deformation can be applied to an object in reaction to any or all of the four kinetic vectors associated with the object, i.e., its linear velocity and/or acceleration, and/or its angular velocity and/or acceleration. Each type of deformation associated with each kinetic vector can then be made active or not, and can be fine tuned individually with a different sensitivity factor $s_d$ and a different maximum deformation rate $m_d$. None of the deformations affects the computation of the others; they are computed independently and then applied together to the object to create the overall effect. In FIG. 23 the combined flex (with curved profile), stretch (with the keep volume constant option set), and yield (with curved profile) deformations of the wire frame cube are shown for linear velocity or acceleration. These same combined deformation effects are shown for a wire frame cube, as a function of angular velocity or acceleration in FIG. 24.

Although the present invention has been described in connection with the preferred form of practicing it, those of ordinary skill in the art will understand that many modifications can be made thereto within the scope of the claims that follow. For example, although the present invention is included as a module in a 3D modeling program, it could be provided to the user as a separately running program. Accordingly, it is not intended that the scope of the invention in any way be limited by the above description, but instead be determined entirely by reference to the claims that follow.

The invention in which an exclusive right is claimed is defined by the following:

1. A method for deforming a graphic object, to simulate effects of motion, comprising the steps of:
    (a) providing a motion vector for the graphic object that indicates its motion;
    (b) providing a plurality of control vertices for the graphic object, said control vertices defining a shape of the graphic object;
    (c) determining a plurality of offsets for the plurality of control vertices, as a function of the motion vector; and
    (d) deforming the graphic object by applying the plurality of offsets to the plurality of control vertices, thereby changing a shape of the graphic object accordingly.

2. The method of claim 1, wherein the motion vector defines at least one of a linear velocity, a rotational velocity, a linear acceleration, and a rotational acceleration for the graphic object.

3. The method of claim 1, wherein the step of deforming comprises the step of applying at least one of a flex, a stretch, and a yield to the shape of the graphic object.

4. The method of claim 3, wherein the flex comprises one of a linear profile flex deformation and a curved profile flex deformation of the graphic object.

5. The method of claim 3, wherein the yield comprises one of a linear profile yield deformation and a curved profile yield deformation of the graphic object.

6. The method of claim 3, wherein the step of applying the stretch to the shape of the graphic object selectively maintains a volume of the graphic object constant, by compensating any change in the shape of the graphic object relative to a first axis by a proportional offsetting change in the shape of the graphic object relative to a second axis that is orthogonal to the first axis.

7. The method of claim 1, further comprising the step of enabling an operator to select at least one parameter that controls the deformation of the graphic object.

8. The method of claim 7, wherein said at least one parameter includes at least one of a maximum deformation, a deformation sensitivity, a type of deformation to be applied to the graphic object, and a motion vector for determining the deformation of the graphic object.

9. The method of claim 7, further comprising the step of tagging selected control vertices, said at least one parameter comprising an option to determine and to apply the offset only to the control vertices that are tagged.

10. The method of claim 7, said at least one parameter further comprising an option to preclude a deformation of the graphic object relative to at least one of a plurality of orthogonal axes.

11. The method of claim 1, wherein the motion vector is provided to deform a static graphic object.

12. A system for deforming a graphic object to simulate effects of motion, comprising:
(a) a central processor that executes machine instructions;
(b) a memory for storing the machine instructions to be executed by the central processor; and
(c) a monitor coupled to the central processor, for displaying the graphic object in accord with the machine instructions that are executed by the central processor, said machine instructions causing the central processor to:
(i) obtain a motion vector for the graphic object, said motion vector defining the translation or the rotation of the graphic object;
(ii) obtain a plurality of control vertices that define a shape of the graphic object;
(iii) determine offsets to be applied to the plurality of control vertices, as a function of the motion vector;
(iv) apply the offsets to the plurality of control vertices to produce a deformed graphic object; and
(v) display the deformed graphic object on the monitor.

13. The system of claim 12, wherein the motion vector defines at least one of a linear velocity, a rotational velocity, a linear acceleration, and a rotational acceleration for the graphic object.

14. The system of claim 12, wherein the offsets change a shape of the graphic object by applying at least one of a flex, a stretch, and a yield to the control vertices.

15. The system of claim 14, wherein the flex comprises one of a linear profile flex deformation and a curved profile flex deformation of the graphic object.

16. The system of claim 14, wherein the yield comprises one of a linear profile yield deformation and a curved profile yield deformation of the graphic object.

17. The system of claim 14, wherein when applying the stretch, a volume of the graphic object is selectively maintained constant by compensating any change in the shape of the graphic object relative to a first axis with a proportional offsetting change in the shape of the graphic object relative to a second axis that is orthogonal to the first axis.

18. The system of claim 12, wherein the machine instructions cause the central processor to enable an operator to select parameters that control the deformation of the graphic object.

19. The system of claim 18, wherein the parameters include at least one of a maximum deformation, a deformation sensitivity, a type of deformation to be applied to the graphic object, and a motion vector for determining the deformation of the graphic object.

20. The system of claim 18, wherein the machine instructions also cause the central processor to enable the operator to tag selected control vertices, said parameters further including an option to determine and to apply the offset only to the control vertices that are tagged.

21. The system of claim 18, wherein the parameters further include an option to enable the operator to selectively preclude a deformation of the graphic object relative to at least one of a plurality of orthogonal axes.

22. The system of claim 12, wherein the machine instructions also cause the central processor to enable the operator to selectively deform a static graphic object based on the motion vector.

23. An article of manufacture comprising:
(a) a nonvolatile memory storage device; and
(b) a plurality of machine instructions stored in the nonvolatile memory storage device, said plurality of machine instructions being adapted to cause a processor on which the plurality of machine instructions are executed to:
(i) obtain a motion vector for a graphic object that is to be deformed, deformation of the graphic object causing the graphic object to appear less stiff when the graphic object is translated or rotated;
(ii) obtain a plurality of control vertices that define a shape of the graphic object;
(iii) determine offsets to be applied to the plurality of control vertices, as a function of the motion vector;
(iv) apply the offsets to the plurality of control vertices to produce a deformed graphic object; and
(v) display the deformed graphic object on a monitor.

24. The article of manufacture of claim 23, wherein the motion vector defines at least one of a linear velocity, a rotational velocity, a linear acceleration, and a rotational acceleration for the graphic object.

25. The article of manufacture of claim 23, wherein the offsets change a shape of the graphic object by applying at least one of a flex, a stretch, and a yield to the control vertices.

26. The article of manufacture of claim 25, wherein the flex comprises one of a linear profile flex deformation and a curved profile flex deformation of the graphic object.

27. The article of manufacture of claim 25, wherein the yield comprises one of a linear profile yield deformation and a curved profile yield deformation of the graphic object.

28. The article of manufacture of claim 25, wherein when applying the stretch, a volume of the graphic object is selectively maintained constant by compensating any change in the shape of the graphic object relative to a first axis with a proportional offsetting change in the shape of the graphic object relative to a second axis that is orthogonal to the first axis.

29. The article of manufacture of claim 23, wherein the machine instructions cause the processor to enable an operator to select at least one parameter that controls the deformation of the graphic object.

30. The article of manufacture of claim 29, wherein said at least one parameter includes at least one of a maximum deformation, a deformation sensitivity, a type of deformation to be applied to the graphic object, and a motion vector for determining the deformation of the graphic object.

31. The article of manufacture of claim 29, wherein the machine instructions also cause the processor to enable the operator to tag selected control vertices, said at least one parameter including an option to determine and to apply the offset only to the control vertices that are tagged.

32. The article of manufacture of claim 29, wherein said at least one parameter includes an option to enable the operator to selectively preclude a deformation of the graphic object relative to at least one of a plurality of orthogonal axes.

33. The article of manufacture of claim 23, wherein the machine instructions also cause the processor to enable the operator to selectively deform a static graphic object based on the motion vector.

* * * * *